United States Patent
Kobayashi et al.

(10) Patent No.: US 11,123,810 B2
(45) Date of Patent: Sep. 21, 2021

(54) CUTTING INSERT AND INDEXABLE ROTARY CUTTING TOOL

(71) Applicant: MOLDINO Tool Engineering, Ltd., Tokyo (JP)

(72) Inventors: Yoshiyuki Kobayashi, Narita (JP); Hayato Takahashi, Narita (JP); Syoujirou Touma, Narita (JP)

(73) Assignee: MOLDINO TOOL ENGINEERING, LTD., Tokyo (JP)

( * ) Notice: Subject to any disclaimer, the term of this patent is extended or adjusted under 35 U.S.C. 154(b) by 122 days.

(21) Appl. No.: 16/312,001

(22) PCT Filed: Jun. 23, 2017

(86) PCT No.: PCT/JP2017/023160
§ 371 (c)(1),
(2) Date: Dec. 20, 2018

(87) PCT Pub. No.: WO2018/003684
PCT Pub. Date: Jan. 4, 2018

(65) Prior Publication Data
US 2019/0160560 A1    May 30, 2019

(30) Foreign Application Priority Data
Jun. 27, 2016 (JP) .............................. JP2016-126975

(51) Int. Cl.
*B23C 5/10* (2006.01)
*B23C 5/20* (2006.01)

(52) U.S. Cl.
CPC .................. *B23C 5/10* (2013.01); *B23C 5/20* (2013.01); *B23C 2200/203* (2013.01); *B23C 2200/28* (2013.01); *B23C 2200/361* (2013.01)

(58) Field of Classification Search
CPC ............ B23C 5/1036; B23C 2200/203; B23C 5/1009; B23C 5/10; B23C 5/20; B23C 5/14
See application file for complete search history.

(56) References Cited

U.S. PATENT DOCUMENTS

| 5,782,589 A | 7/1998 | Cole |
|---|---|---|
| 8,529,163 B2 | 9/2013 | Saji |

(Continued)

FOREIGN PATENT DOCUMENTS

| JP | 52-095982 U | 7/1977 |
|---|---|---|
| JP | 2000-288823 A | 10/2000 |

(Continued)

OTHER PUBLICATIONS

Tool and Manufacturing Engineer's Handbook, vol. I, Fourth Edition, May 1984 (Year: 1984).*

(Continued)

*Primary Examiner* — Alan Snyder
(74) *Attorney, Agent, or Firm* — Locke Lord LLP

(57) ABSTRACT

A cutting insert includes a cutting edge portion, and the cutting edge portion includes a bottom cutting edge forming an arc shape that protrudes toward a front end side in a central axis direction, an outer peripheral cutting edge forming an arc shape that protrudes toward an outside in a radial direction, and a cutting edge of corner that connects an outer end of the bottom cutting edge in the radial direction and a front end of the outer peripheral cutting edge in the central axis direction and forms an arc shape that protrudes toward a front end outer circumferential side. The bottom cutting edge and the outer peripheral cutting edge are formed so as to form a linearly symmetric shape together (Continued)

with respect to an imaginary straight line that passes through an arc central point of the cutting edge of corner and intersects the central axis.

18 Claims, 12 Drawing Sheets

(56) References Cited

U.S. PATENT DOCUMENTS

| | | | |
|---|---|---|---|
| 10,092,965 B2* | 10/2018 | Burtscher | .......... A61K 31/4741 |
| 2010/0172703 A1 | 7/2010 | Neubold | |
| 2011/0008112 A1 | 1/2011 | Abe | |
| 2011/0008113 A1* | 1/2011 | Abe | ........................ B23C 5/109 |
| | | | 407/42 |

FOREIGN PATENT DOCUMENTS

| | | |
|---|---|---|
| JP | 2005-169511 A | 6/2005 |
| JP | 2007-152502 A | 6/2007 |
| JP | 2007-515303 A | 6/2007 |
| JP | 2010-520064 A | 6/2010 |
| WO | 2004/058438 A1 | 7/2004 |
| WO | 2009/123192 A1 | 10/2009 |
| WO | 2015/123708 A1 | 8/2015 |
| WO | 2015/156373 A1 | 10/2015 |

OTHER PUBLICATIONS

Suuplementary European Search Report dated Jan. 23, 2020, issued for European Patent Application No. 17820041.6.
Notice of Allowance dated Sep. 17, 2019, issued for Japanese patent application No. 2018-525130 and English translation thereof.
International Search Report dated Sep. 5, 2017, issued for PCT/JP2017/023160 and English translation thereof.

* cited by examiner

# CUTTING INSERT AND INDEXABLE ROTARY CUTTING TOOL

TECHNICAL FIELD

The present invention relates to a cutting insert preferable to carry out a face milling-process (planar surface process), a side wall milling process (vertical wall surface process), or the like on a work material and an indexable rotary cutting tool equipped with the cutting insert.

Priority is claimed on Japanese Patent Application No. 2016-126975, filed on Jun. 27, 2016, the content of which is incorporated herein by reference.

BACKGROUND ART

In the related art, for example, solid-type end mills as described in Patent Documents 1 and 2 are known. This kind of end mill includes a shank that is rotated around a central axis and a cutting edge portion formed at a front end portion of the shank. In addition, in the cutting edge portion, a bottom cutting edge forming an arc shape that protrudes toward a front end side is disposed at a front end portion in a central axis direction, and an outer peripheral cutting edge forming an arc shape that protrudes toward an outside in a radial direction is disposed at an outer end portion in the radial direction.

In addition, when a face-milling process (planar surface process) is carried out on a work material, the bottom cutting edge is used, and, when a side-milling process (vertical wall surface process) is carried out thereon, the outer peripheral cutting edge is used.

CITATION LIST

Patent Literature

[Patent Document 1] Published Japanese Translation No. 2010-520064 of the PCT International Publication
[Patent Document 2] Japanese Unexamined Patent Application, First Publication No. 2007-152502

DISCLOSURE OF INVENTION

Technical Problem

However, in the end mills of the related art, there was a problem described below.

It was difficult to finish kerfs (processing marks or processing scars) imparted to a processing surface by cutting with the bottom cutting edge when a face-milling process is carried out on a work material and kerfs imparted to the processing surface by cutting with the outer peripheral cutting edge when a side-milling process is carried out to a mutually identical status. That is, the status of the processing surface after the cutting process varied depending on the processing portion or the shape of the work material, and it was impossible to make uniform the process accuracy throughout the entire processing surface in a finishing process, a semi-finishing process, or the like.

The present invention has been made in consideration of the above-described circumstance, and an object of the present invention is to provide a cutting insert enabling a cutting process to be carried out so that the status of a processing surface becomes uniform regardless of the processing portion or the shape of a work material and an indexable rotary cutting tool in which the cutting insert is used.

Solution to Problem

An aspect of the present invention is a cutting insert that is detachably mounted in an mounting seat formed in a front end portion of a tool main body that is rotated around a central axis, the cutting insert including:
a plate-shaped insert main body and a cutting edge portion formed in the insert main body,
in which the cutting edge portion includes
a bottom cutting edge that is disposed in a front end portion of the insert main body in the central axis direction, extends along a radial direction that is orthogonal to the central axis, and forms an arc shape that protrudes toward a front end side in the central axis direction,
a rake face of the bottom cutting edge,
an outer peripheral cutting edge that is disposed in an outer end portion of the insert main body in the radial direction, extends along the central axis direction, and forms an arc shape that protrudes toward an outside in the radial direction,
a rake face of the outer peripheral cutting edge,
a cutting edge of corner R that connects an outer end of the bottom cutting edge in the radial direction and a front end of the outer peripheral cutting edge in the central axis direction and forms an arc shape that protrudes toward a front end outer circumferential side, and
a rake face of the cutting edge of corner R,
in which, when the rake face of the cutting edge of corner R is seen as a front surface,
the bottom cutting edge and the outer peripheral cutting edge are formed so as to form a linearly symmetric shape together with respect to an imaginary straight line that passes through an arc central point of the cutting edge of corner R, extends toward a base end side in the central axis direction from the arc central point toward an inside in the radial direction, and intersects the central axis at an angle of 45° as a symmetry axis.

In addition, an aspect of the present invention is a cutting insert that is detachably mounted in an mounting seat formed in a front end portion of a tool main body that is rotated around a central axis, the cutting insert including:
a plate-shaped insert main body and a cutting edge portion formed in the insert main body,
in which the cutting edge portion includes
a bottom cutting edge that is disposed in a front end portion of the insert main body in the central axis direction, extends along a radial direction that is orthogonal to the central axis, and forms an arc shape that protrudes toward a front end side in the central axis direction,
a rake face of the bottom cutting edge,
an outer peripheral cutting edge that is disposed in an outer end portion of the insert main body in the radial direction, extends along the central axis direction, and forms an arc shape that protrudes toward an outside in the radial direction,
a rake face of the outer peripheral cutting edge,
a cutting edge of corner R that connects an outer end of the bottom cutting edge in the radial direction and a front end of the outer peripheral cutting edge in the central axis direction and forms an arc shape that protrudes toward a front end outer circumferential side, and a rake face of the cutting edge of corner R, in which a curvature radius of the bottom cutting edge and a curvature radius of the outer peripheral cutting edge are equal to each other, when the rake face of the cutting edge of corner R is seen as a front surface, a straight line that passes through a front end of the bottom cutting edge in the central axis direction and extends in the radial direction is considered as a radial-direction reference line, a straight line that passes through an outer end of the outer peripheral cutting edge in the radial direction and extends in the central axis direction is considered as a central axis-direction reference line, a tangent line at a boundary point between the cutting edge of corner R and the bottom cutting edge is considered as a first tangent line, a tangent line at a boundary point between the cutting edge of corner R and the outer peripheral cutting edge is considered as a second tangent line, a rectangular triangle formed by connecting an intersection point between the first tangent line and the radial-direction reference line, an intersection point between the first tangent line and the central axis-direction reference line, and an intersection point between the radial-direction reference line and the central axis-direction reference line together using straight lines is considered as a first rectangular triangle, and a rectangular triangle formed by connecting an intersection point between the second tangent line and the central axis-direction reference line, an intersection point between the second tangent line and the radial-direction reference line, and the intersection point between the radial-direction reference line and the central axis-direction reference line together using straight lines is considered as a second rectangular triangle, the first rectangular triangle and the second rectangular triangle are congruent with each other.

In addition, an aspect of the present invention is an indexable rotary cutting tool including a tool main body that is rotated around a central axis, an mounting seat formed in a front end portion of the tool main body, and a cutting insert that is detachably mounted in the mounting seat, in which the above-described cutting insert is used as the cutting insert.

In addition, in the cutting insert, it is preferable that a screw insertion hole that penetrates the insert main body in a thickness direction be formed in the insert main body, and a hole center of the screw insertion hole be located on the imaginary straight line.

In addition, in the cutting insert, it is preferable that a screw insertion hole that penetrates the insert main body in a thickness direction be formed in the insert main body, and a hole center of the screw insertion hole be located on an imaginary straight line that passes through the intersection point between the radial-direction reference line and the central axis-direction reference line and an arc central point of the cutting edge of corner R.

In addition, in the cutting insert, the rake face of the bottom cutting edge, the rake face of the outer peripheral cutting edge, and the rake face of the cutting edge of corner R are preferably formed on the same planar surface.

In addition, in the cutting insert, when the rake face of the cutting edge of corner R is seen as the front surface, a straight line that passes through a front end of the bottom cutting edge in the central axis direction and extends in the radial direction is considered as a radial-direction reference line, the tangent line at the boundary point between the cutting edge of corner R and the bottom cutting edge is considered as the first tangent line, and the tangent line at the boundary point between the cutting edge of corner R and the outer peripheral cutting edge is considered as the second tangent line, it is preferable that an angle $\theta 1$ formed between the first tangent line and the radial-direction reference line be 12° to 25°, and an angle $\theta 2$ formed between the second tangent line and the radial-direction reference line be $(90°-\theta 1)°$.

In addition, in the cutting insert, the curvature radius of the cutting edge of corner R is preferably 33% or less of the curvature radius of the bottom cutting edge and the curvature radius of the outer peripheral cutting edge.

In addition, in the cutting insert, it is preferable that a twist angle of the outer peripheral cutting edge have a positive value, a radial-direction rake angle of the cutting edge of corner R at the boundary point between the cutting edge of corner R and the outer peripheral cutting edge have a positive value, and a radial-direction rake angle of the cutting edge of corner R at the boundary point between the cutting edge of corner R and the bottom cutting edge have a positive value.

Advantageous Effects of Invention

According to the cutting insert and the indexable rotary cutting tool of the present invention, it is possible to carry out a cutting process so that the status of a processing surface becomes uniform regardless of the processing portion or the shape of a work material. Therefore, it is possible to obtain a favorable processing surface accuracy throughout the entire processing surface in a finishing process, a semi-finishing process, or the like.

BEST MODE FOR CARRYING OUT THE INVENTION

Figure 1:
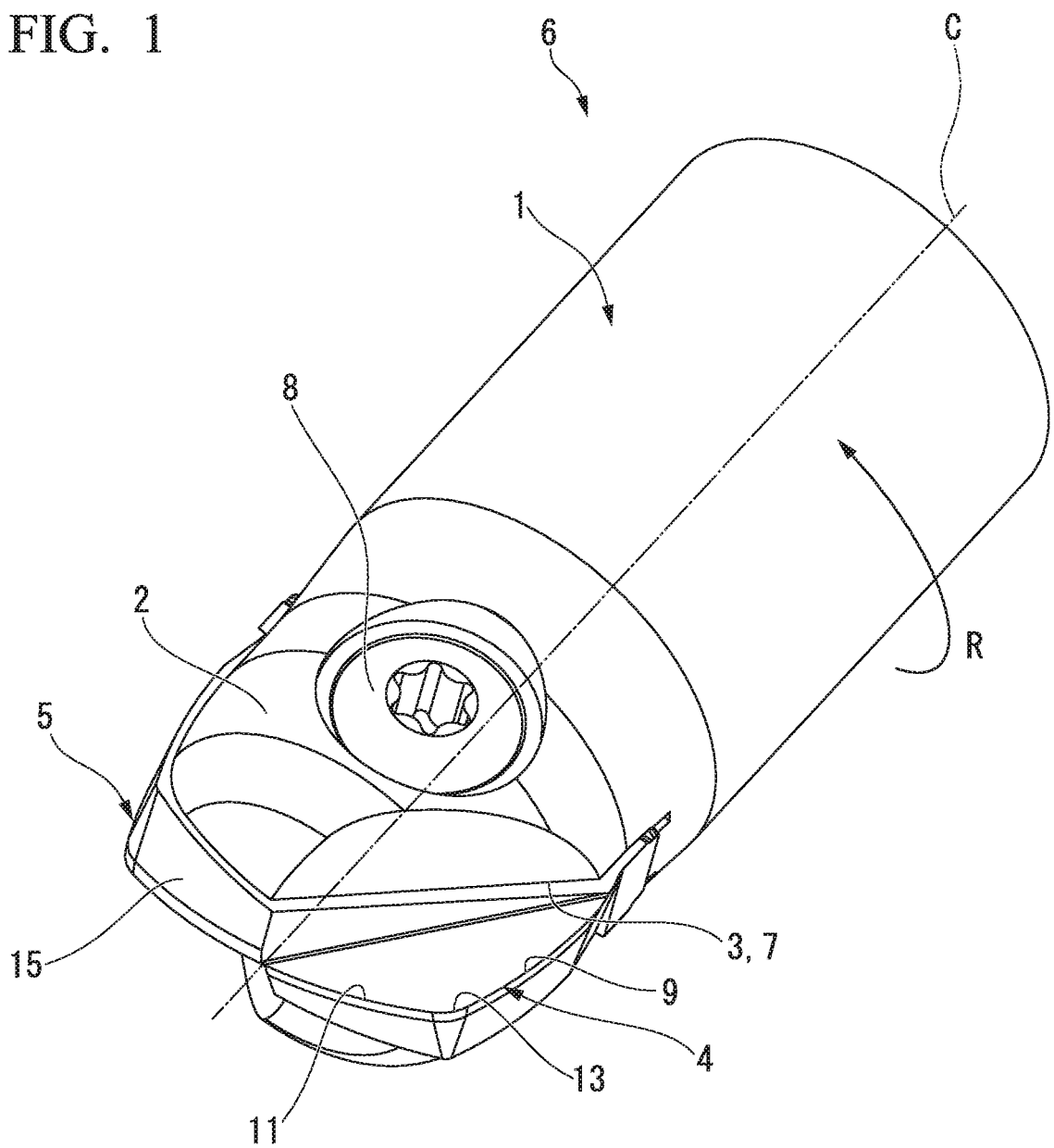
FIG. 1 is a perspective view illustrating an indexable rotary cutting tool according to an embodiment of the present invention.
Figure 2:
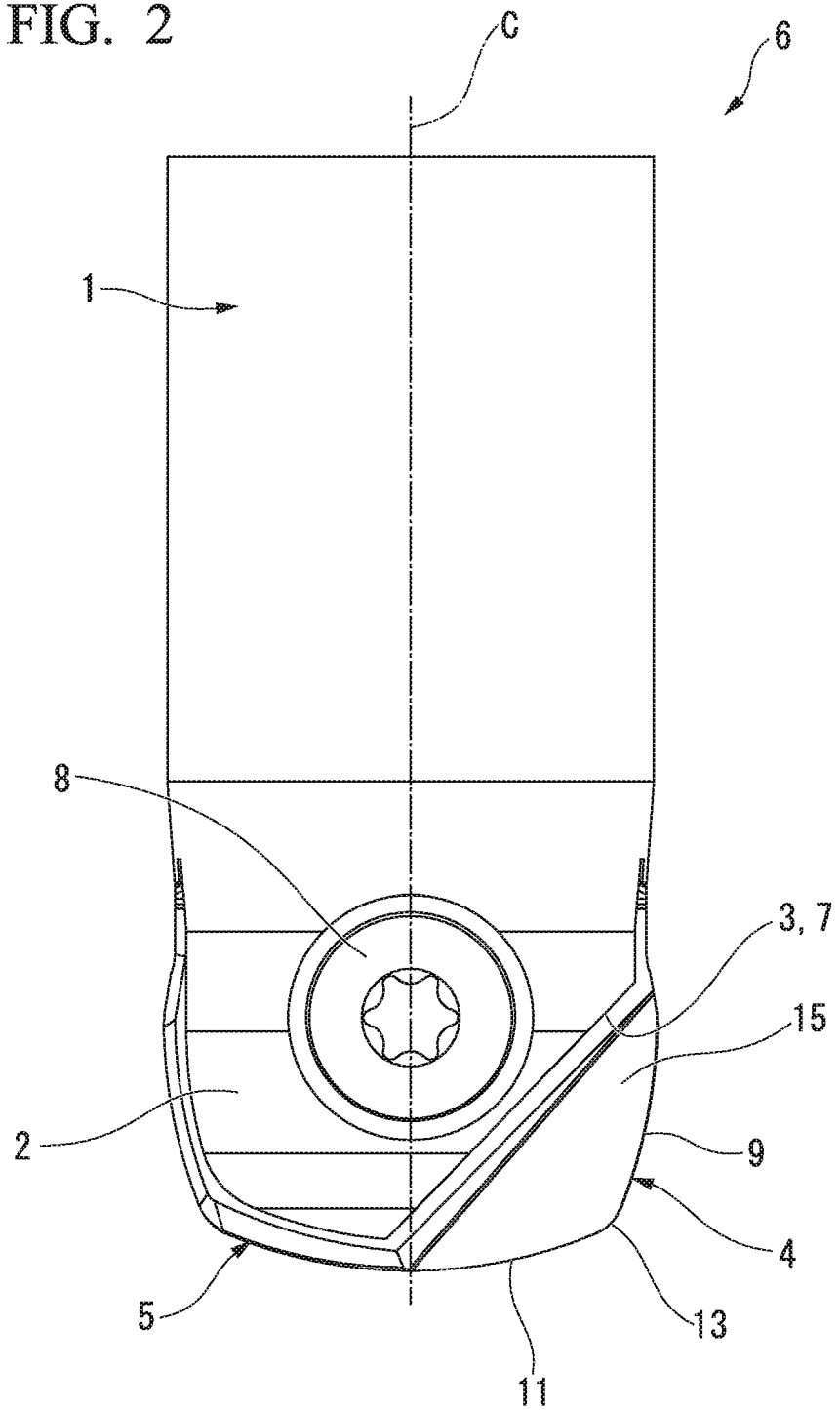
FIG. 2 is a plan view of the indexable rotary cutting tool.
Figure 3:
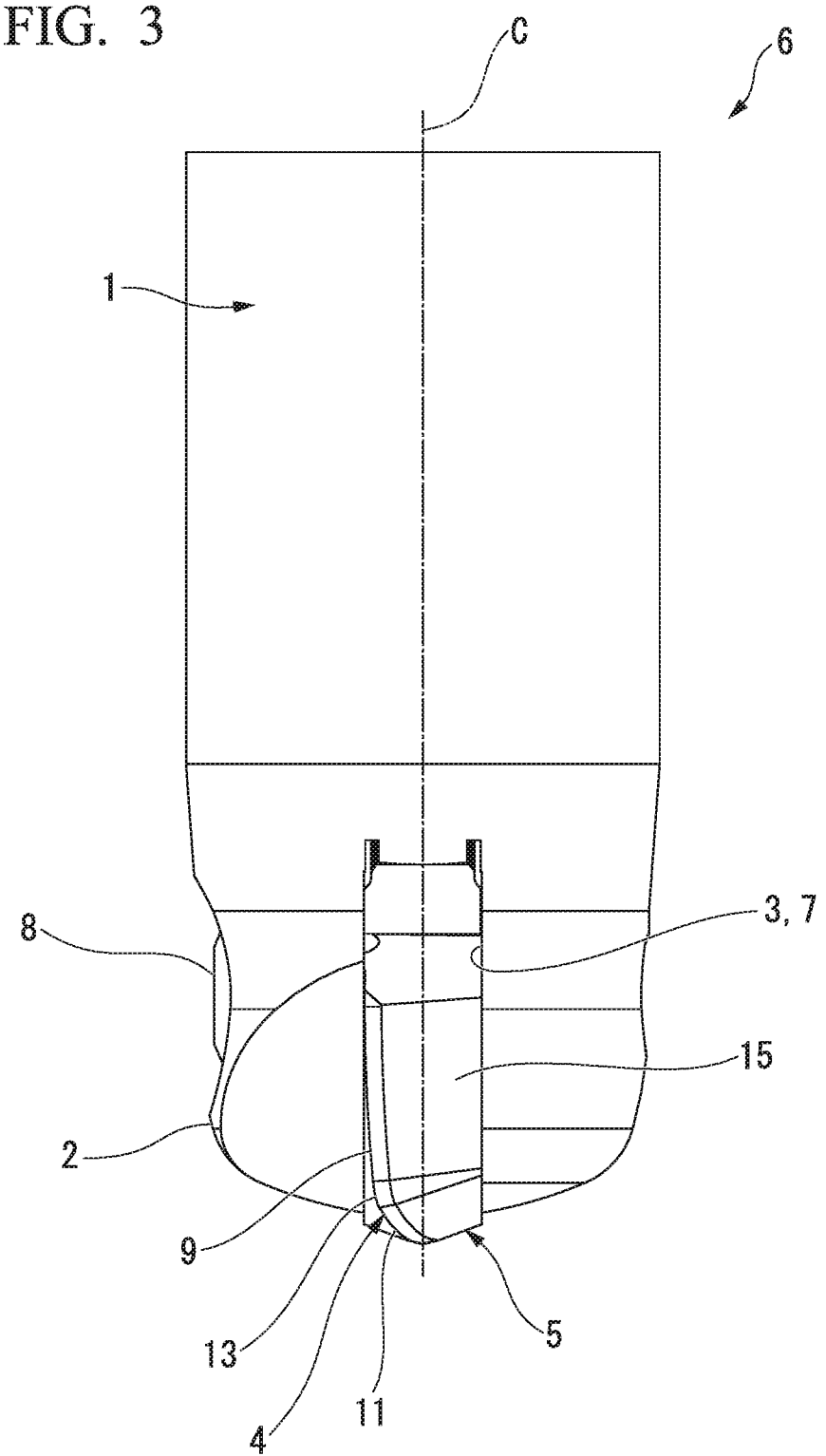
FIG. 3 is a side view of the indexable rotary cutting tool.
Figure 4:
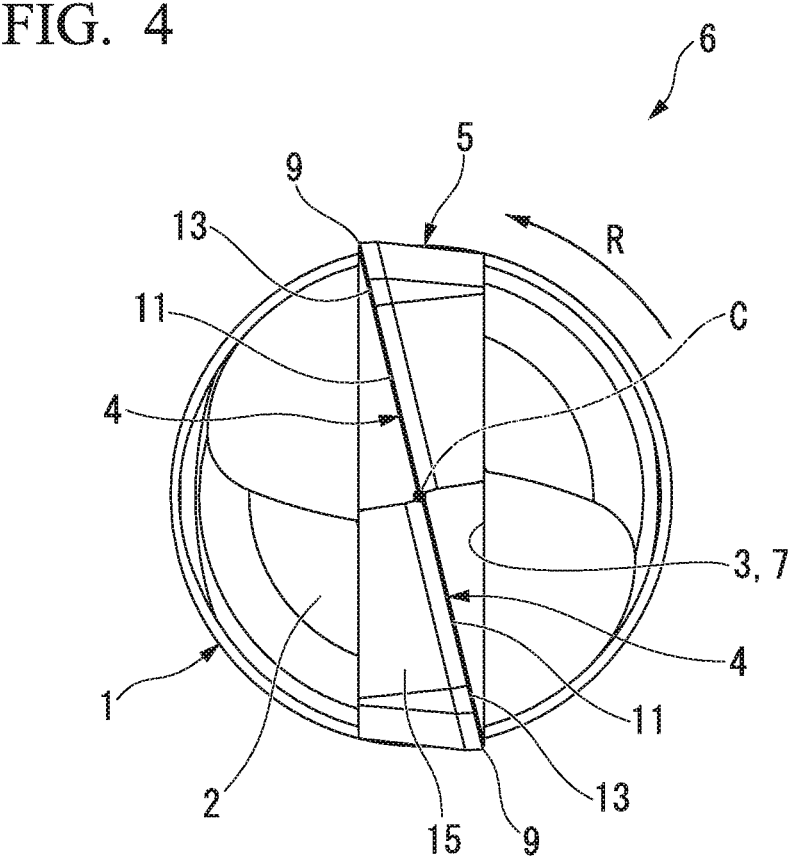
FIG. 4 is a front view of the indexable rotary cutting tool.
Figure 5:
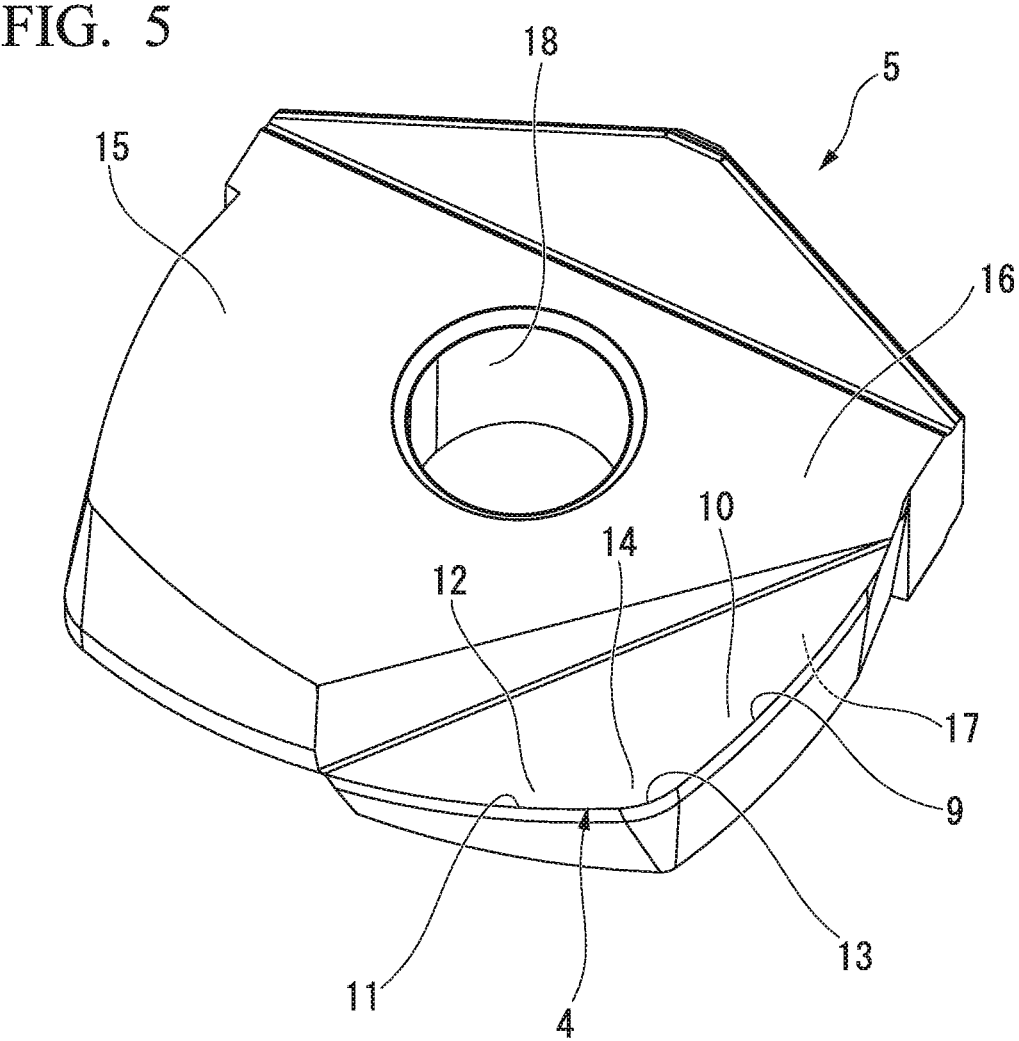
FIG. 5 is a perspective view illustrating a cutting insert that is mounted in the indexable rotary cutting tool.
Figure 6:
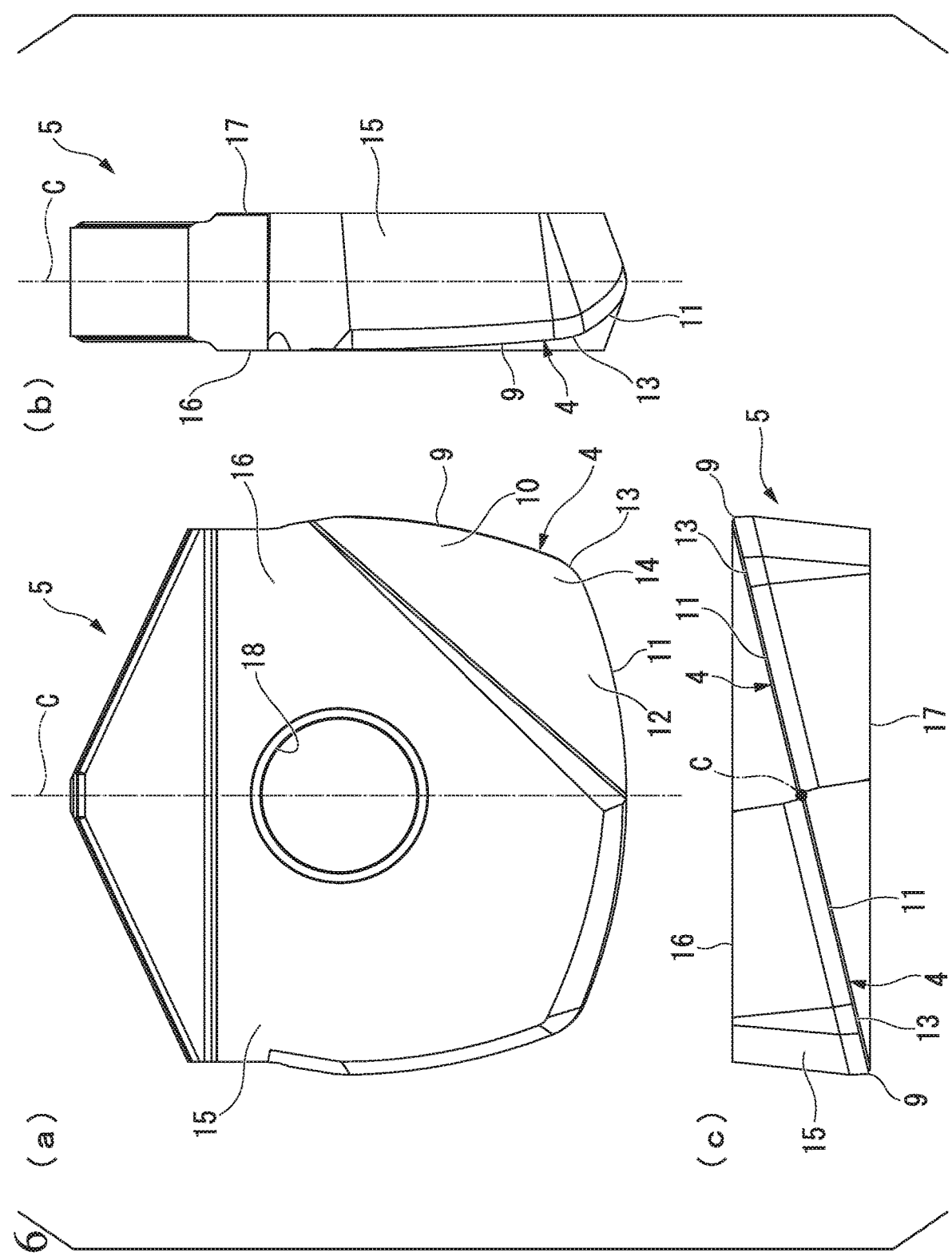
FIG. 6(a) is a plan view.
FIG. 6(b) is a side view.
FIG. 6(c) is a front view, which illustrate the cutting insert.
Figure 7:
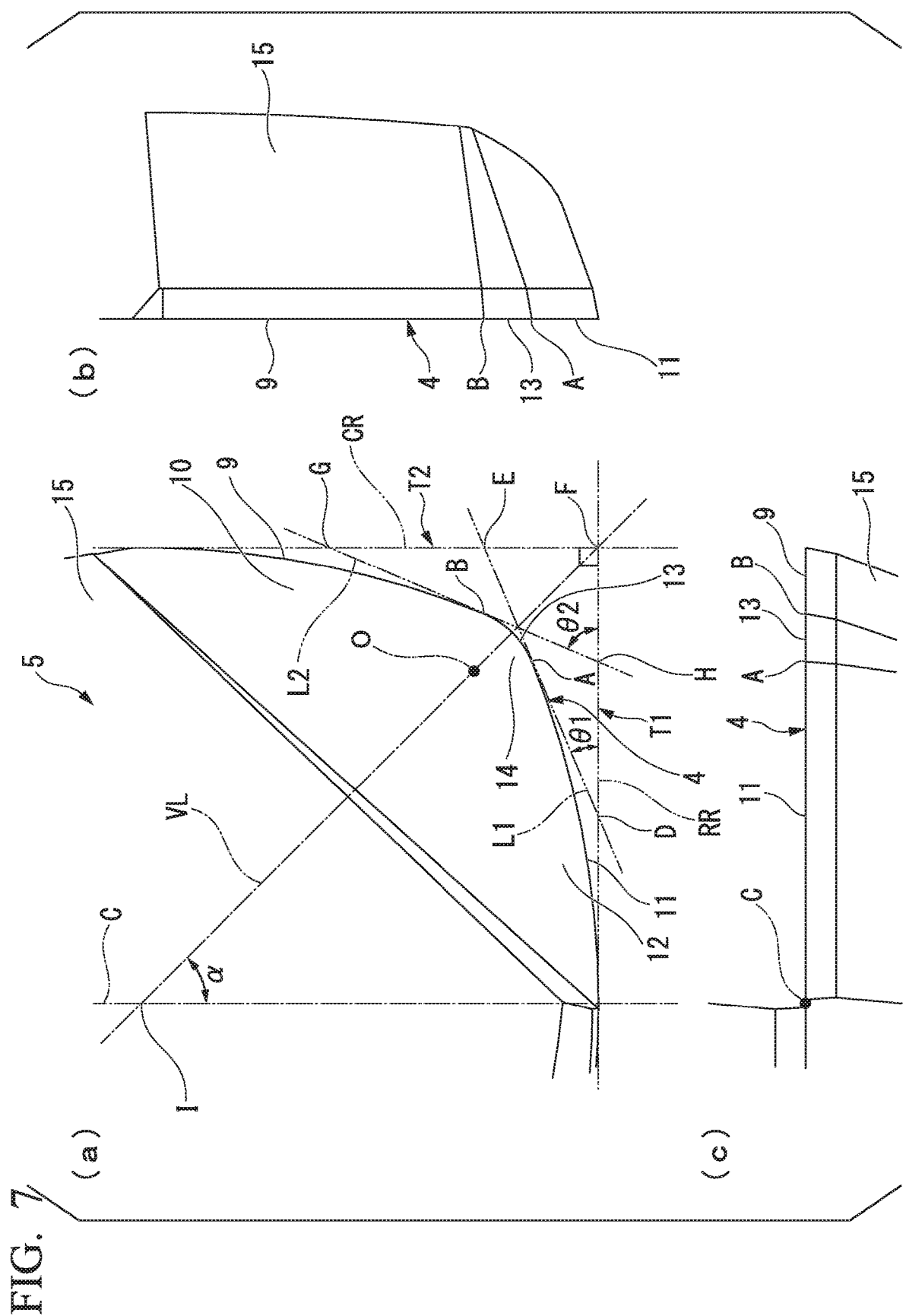
FIG. 7(a) is a plan view.
FIG. 7(b) is a side view.
FIG. 7(c) is a front view, which illustrate a cutting edge portion of the cutting insert in an enlarged manner.

Hereinafter, a cutting insert 5 according to an embodiment of the present invention and an indexable rotary cutting tool 6 including the cutting insert will be described with reference to drawings.

The cutting insert 5 of the present embodiment is a composite R insert including a composite R cutting edge constituted of a convex arc-shaped bottom cutting edge 11 that is referred to as a so-called lens, a convex arc-shaped outer peripheral cutting edge 9 that is referred to as a so-called barrel, and a convex arc-shaped cutting edge of corner R 13 that connects the bottom cutting edge 11 and the outer peripheral cutting edge 9. In addition, the indexable rotary cutting tool 6 including this cutting insert 5 is suitable to carry out a variety of cutting processes including a face-milling process (planar surface process) or a side-milling process (vertical wall surface process) on a work material and is capable of obtaining an excellent surface accuracy in, particularly, a finishing process, a semi-finishing process, or the like of a processing surface.

As illustrated in FIG. 1 to FIG. 4, the indexable rotary cutting tool 6 includes a substantially cylindrical tool main body 1 that is rotated around a central axis C, an mounting seat 3 formed at a front end portion 2 of the tool main body 1 in a central axis C direction, and the cutting insert 5 that is detachably mounted in the mounting seat 3 and has a cutting edge portion 4.

The indexable rotary cutting tool 6 of the present embodiment includes the tool main body 1 formed of a steel material or the like and the cutting insert 5 formed of cemented carbide or the like that is harder than the tool main body 1. The cutting insert 5 forming a plate shape is removably mounted in the mounting seat (insert mounting seat) 3 formed at the front end portion 2 of the tool main body 1 in a state in which an insert central axis coincides with the central axis C of the tool. The cutting insert 5 attached to the mounting seat 3 is disposed so that the cutting edge portion 4 protrudes toward a front end side and a radial-direction outside of the tool main body 1.

A base end portion (shank portion) of the tool main body 1 is attached to a main shaft (not illustrated) of a machine tool, and the indexable rotary cutting tool 6 is rotated in a tool rotation direction R around the central axis C in association with the main shaft being rotary-driven. In addition, the tool main body 1 is sent in a direction intersecting the central axis C or the central axis C direction together with the main shaft, thereby cutting into a work material made of a metallic material or the like with the cutting edge portion 4 of the cutting insert 5 to carry out a rotary cutting process (milling process). Meanwhile, the indexable rotary cutting tool 6 of the present embodiment is more preferably used in, for example, a machine tool such as a multiaxis (four to six axes) control machining center or the like.

In the present embodiment, a direction in which the central axis C of the tool main body 1 extends, that is, a direction along the central axis C will be referred to as the central axis C direction. In addition, in the central axis C direction, a direction from the shank portion toward the mounting seat 3 of the tool main body 1 (a downward direction in FIG. 2 and FIG. 3) will be referred to as a front end side, and a direction from the mounting seat 3 toward the shank portion (an upward direction in FIG. 2 and FIG. 3) will be referred to as a base end side.

In addition, a direction perpendicular to the central axis C will be referred to as a radial direction. In the radial direction, a direction toward the central axis C will be referred to as an inside of the radial direction, and a direction away from the central axis C will be referred to as an outside of the radial direction.

In addition, a direction around the central direction C will be referred to as a circumferential direction. In the circumferential direction, an orientation in which the tool main body 1 is rotated by the rotation of the main shaft at the time of cutting will be referred to as a tool rotation direction R, and a rotation direction opposite to the tool rotation direction will be referred to as an opposite side to the tool rotation direction R (that is, reverse tool rotation direction).

Meanwhile, the definitions of the above-described orientations (directions) shall also apply in the same manner to those in the cutting insert 5 in which an insert central axis is set to coincide with the central axis C of the indexable rotary cutting tool 6 (concentrically disposed). Therefore, in FIG. 6 to FIG. 10 and FIG. 12 illustrating the cutting insert 5, the insert central axis will be expressed using the same reference sign C as the central axis C.

In FIG. 1 to FIG. 4, the mounting seat 3 includes a slit-shaped insert fitting groove 7 formed to include the central axis C of the tool and extend in the radial direction and a fixing screw 8 for fixing the cutting insert 5 inserted into the insert fitting groove 7 in the front end portion 2 of the tool main body 1.

The insert fitting groove 7 is open on a front end surface of the tool main body 1 and extends in the radial direction of the tool main body 1 and is also open on an outer circumferential surface of the tool main body 1. The insert fitting groove 7 forms a slit shape that is formed in a predetermined length (depth) from the front end surface of the tool main body 1 toward the base end side.

The slit-shaped insert fitting groove 7 formed in the front end portion 2 of the tool main body 1 divides the front end portion 2 of the tool main body 1 into two parts and forms a pair of front end half body portions (halved pieces). In addition, in the front end portion 2, an insert fixing screw hole is formed from one surface portion of the front end half body portion so as to intersect the insert fitting groove 7 and reach an inside of the other front end half body portion. A screw hole central axis of the insert fixing screw hole extends in the radial direction in the front end portion 2, specifically, extends in an orientation orthogonal to an orientation in which the insert fitting groove 7 extends in the radial direction of the tool main body 1.

In the insert fixing screw hole, an inner diameter of a hole portion formed in one front end half body portion is set to be larger than an inner diameter of a hole portion formed in the other front end half body portion. In addition, on an inner circumferential surface of the hole portion in the other front end half body portion, a female screw portion that screws to a male screw portion of the fixing screw 8 is formed. In the insert fixing screw hole, the hole portion formed in at least one front end half body portion forms a through-hole. In the example of the present embodiment, the respective hole portions of the front end half body portion and the other front end half body portion respectively form a through-hole.

As illustrated in FIG. 5 to FIG. 8, the cutting insert 5 includes a plate-shaped insert main body 15, the cutting edge portion 4 formed in the insert main body 15, and a screw insertion hole 18 that is formed in the insert main body 15 and penetrates the insert main body 15 in a thickness direction.

The cutting insert 5 of the present embodiment is formed in a front-and-rear inverse symmetric manner (180° rotational symmetric manner) with respect to the central axis C as a symmetry axis.

The insert main body 15 forms a substantially flat plate shape. Front and rear surfaces in the thickness direction of the insert main body 15 form a pair of flat surface portions 16 and 17. The screw insertion hole 18 is a through-hole that penetrates the insert main body 15 in the thickness direction and is formed to be open on one flat surface portion 16 and the other flat surface portion 17. Into the screw insertion hole 18, the fixing screw 8 is inserted when the cutting insert 5 is mounted in and fixed to the mounting seat 3. The disposition of the screw insertion hole 18 in the insert main body 15 will be described separately below.

The cutting edge portion 4 is disposed at the front end portion in the central axis C direction and an outer end portion in the radial direction in the insert main body 15. The cutting edge portion 4 includes a rake face facing in the tool rotation direction R, a flank surface that intersects the rake face and faces toward at least any of the front end side and the radial direction outside, and a cutting edge that is formed along an intersection ridge between the rake face and the flake surface.

In the cutting edge, the outer peripheral cutting edge 9, the bottom cutting edge 11, and the cutting edge of corner R 13 are included. The cutting edge includes the outer peripheral cutting edge 9, the bottom cutting edge 11, and the cutting edge of corner R 13 and thus forms a substantially L shape as a whole. In addition, in each of the cutting edges (9, 11, and 13), the rake face and the flank surface are disposed adjacent to each other.

The cutting insert 5 of the present embodiment is a two-edge cutting insert and has two sets of the cutting edge including the outer peripheral cutting edge 9, the bottom cutting edge 11, and the cutting edge of corner R 13 in a 180° rotational symmetric manner with respect to the central axis C as a center.

As illustrated in FIG. 7(a), the bottom cutting edge 11 is disposed in the front end portion of the insert main body 15 in the central axis C direction, extends along the radial direction, and forms an arc shape that protrudes toward the front end side in the central axis C direction.

The bottom cutting edge 11 extends with a slope toward the front end side in the central axis C direction from a radial-direction outer end connected to the cutting edge of corner R 13 toward a radial-direction inside. In the bottom cutting edge 11, the amount of displacement in the central axis C direction per unit length along the radial direction (that is, the slope relative to the radial direction) decreases gradually from the radial-direction outer end of the bottom cutting edge 11 toward the radial-direction inside and reaches zero at a radial-direction inner end.

In a total cutting edge length of the cutting edge portion 4, the radial-direction inner end of the bottom cutting edge 11 is located in a leading end in the central axis C direction. In the present embodiment, the radial-direction inner end of the bottom cutting edge 11 is disposed on the central axis C. A tangent line (radial-direction reference line described below) RR in the radial-direction inner end (the leading end in the central axis C direction) of the bottom cutting edge 11 extends parallel to a flat surface (horizontal flat surface) perpendicular to the central axis C.

When the cutting insert 5 is mounted in the mounting seat 3 (the insert fitting groove 7) of the tool main body 1, and the indexable rotary cutting tool 6 is rotated around the central axis C, a rotation trajectory of the bottom cutting edge 11 forms a convex lens shape that swells toward the front end side.

In the example of the present embodiment, as illustrated in FIG. 7(b), an axial-direction rake angle (axial rake) of the bottom cutting edge 11 is 0°. However, the axial-direction rake angle is not limited thereto, and the axial-direction rake angle of the bottom cutting edge 11 may be a positive value (positive angle) or a negative value (negative angle). In addition, as illustrated in FIG. 6(c) and FIG. 7(c), a radial-direction rake angle of the bottom cutting edge 11 is set to 0°.

As illustrated in FIG. 7(a), the radial-direction outer end of the bottom cutting edge 11 and the radial-direction inner end of the cutting edge of corner R 13 have a common tangent line (a first tangent line described below) L1 at a boundary point A and are smoothly connected together. That is, a cutting edge portion toward the radial-direction inside from the boundary point A is the bottom cutting edge 11, and a cutting edge portion toward the radial-direction outside from the boundary point A is the cutting edge of corner R 13.

In the rake face facing in the tool rotation direction R of the cutting edge portion 4, a rake face 12 of the bottom cutting edge 11 is formed in a portion adjacent to a base end side of the bottom cutting edge 11 in the central axis direction C. In the example of the present embodiment, the rake face 12 of the bottom cutting edge 11 forms a flat surface shape.

In addition, in the front end surface facing the front end side in the central axis C direction in the insert main body 15, a flank surface of the bottom cutting edge 11 is formed in a portion adjacent to a side opposite to the tool rotation direction R of the bottom cutting edge 11. The flank surface of the bottom cutting edge 11 forms a curved surface shape that protrudes toward the front end side. The flank surface of the bottom cutting edge 11 is inclined toward the base end side in the central axis C direction from the bottom cutting edge 11 toward the side opposite to the tool rotation direction R, which imparts a flank angle to the bottom cutting edge 11.

As illustrated in FIG. 7(a), the outer peripheral cutting edge 9 is disposed in the outer end portion of the insert main body 15 in the radial direction, extends along the central axis C direction, and forms an arc shape that protrudes toward the outside in the radial direction.

The outer peripheral cutting edge 9 extends with a slope toward the radial-direction outside from the front end in the central axis C direction which is connected to the cutting edge of corner R 13 toward the base end side. In the outer peripheral cutting edge 9, the amount of displacement in the radial direction per unit length along the central axis C direction (that is, the slope relative to the central axis C direction) decreases gradually from the front end of the outer peripheral cutting edge 9 in the central axis C direction toward the base end side and reaches zero at the base end in the central axis C direction.

In the total cutting edge length of the cutting edge portion 4, the base end of the outer peripheral cutting edge 9 in the central axis C direction is located in an outermost end in the radial direction. A tangent line (central axis-direction reference line described below) CR in the base end of the outer peripheral cutting edge 9 in the central axis C direction extends parallel to a flat surface (vertical surface) parallel to the central axis C.

When the cutting insert 5 is mounted in the mounting seat 3 of the tool main body 1, and the indexable rotary cutting tool 6 is rotated around the central axis C, a rotation trajectory of the outer peripheral cutting edge 9 forms a barrel shape (barrel shape) that swells toward the radial-direction outside.

In the example of the present embodiment, as illustrated in FIG. 7(b), a twist angle (corresponding to the axial-direction rake angle) of the outer peripheral cutting edge 9 is 0°. However, the twist angle is not limited thereto, and the twist angle of the outer peripheral cutting edge 9 may be a positive value or a negative value. In addition, a radial-direction rake angle (central-direction rake angle, radial rake) of the outer peripheral cutting edge 9 is set to 0°. However, the radial-direction rake angle is not limited thereto, and the radial-direction rake angle of the outer peripheral cutting edge 9 may be a positive value or a negative value.

As illustrated in FIG. 7(a), a front end of the outer peripheral cutting edge 9 in the central axis C direction and a base end of the cutting edge of corner R 13 in the central axis C direction have a common tangent line (a second tangent line described below) L2 at a boundary point B and are smoothly connected together. That is, a cutting edge portion toward the base end side in the central axis C direction from the boundary point B is the outer peripheral cutting edge 9, and a cutting edge portion toward the front end side in the central axis C direction from the boundary point B is the cutting edge of corner R 13.

In the rake face facing in the tool rotation direction R of the cutting edge portion 4, a rake face 10 of the outer peripheral cutting edge 9 is formed in a portion adjacent to a radial-direction inside of the outer peripheral cutting edge 9. In the example of the present embodiment, the rake face 10 of the outer peripheral cutting edge 9 forms a flat surface shape.

In addition, in the outer circumferential surface facing the radial-direction outside in the insert main body 15, a flank surface of the outer peripheral cutting edge 9 is formed in a portion adjacent to a side opposite to the tool rotation direction R of the outer peripheral cutting edge 9. The flank surface of the outer peripheral cutting edge 9 forms a curved surface shape that protrudes toward the radial-direction outside. The flank surface of the outer peripheral cutting edge 9 is inclined toward the radial-direction inside from the outer peripheral cutting edge 9 toward the side opposite to the tool rotation direction R, which imparts a flank angle to the outer peripheral cutting edge 9.

As illustrated in FIG. 7(a), the cutting edge of corner R 13 joins the outer end of the bottom cutting edge 11 in the radial direction and the front end of the outer peripheral cutting edge 9 in the central axis C direction and forms an arc shape that protrudes toward a front end outer circumferential side.

The cutting edge of corner R 13 extends with a slope toward the base end side in the central axis C direction from a radial-direction inner end connected to the bottom cutting edge 11 toward the outside in the radial direction. In the cutting edge of corner R 13, the amount of displacement in the central axis C direction per unit length along the radial direction (that is, the slope relative to the radial direction) increases gradually from the radial-direction inner end of the cutting edge of corner R 13 toward the radial-direction outside.

In addition, the cutting edge of corner R 13 extends with a slope toward the radial-direction inside from the base end in the central axis C direction which is connected to the outer peripheral cutting edge 9 toward the front end side. In the cutting edge of corner R 13, the amount of displacement in the radial direction per unit length along the central axis C direction (that is, the slope relative to the central axis C direction) increases gradually from the base end of the cutting edge of corner R 13 in the central axis C direction toward the front end side.

When the cutting insert 5 is mounted in the mounting seat 3 of the tool main body 1, and the indexable rotary cutting tool 6 is rotated around the central axis C, a rotation trajectory of the cutting edge of corner R 13 is formed in a tubular shape that gradually decreases in diameter toward the front end side in the central axis C direction, and a vertical cross section thereof (a cross section including the central axis C) forms an arc shape (for example, an arc shape having a central angle (arc central angle) of approximately 60° to 85°).

In the example of the present embodiment, as illustrated in FIG. 7(b), an axial-direction rake angle of the cutting edge of corner R 13 at the boundary point A between the cutting edge of corner R 13 and the bottom cutting edge 11 is 0°. In addition, an axial-direction rake angle of the cutting edge of corner R 13 at the boundary point B between the cutting edge of corner R 13 and the outer peripheral cutting edge 9 is 0°. However, the axial-direction rake angles are not limited thereto, and the axial-direction rake angles of the cutting edge of corner R 13 at the boundary points A and B may be a positive value or a negative value.

The radial-direction rake angle of the cutting edge of corner R 13 is set to 0°. However, the radial-direction rake angle is not limited thereto, and the radial-direction rake angle of the cutting edge of corner R 13 may be a positive value or a negative value.

In the rake face facing in the tool rotation direction R of the cutting edge portion 4, a rake face 14 of the cutting edge of corner R 13 is formed in a portion adjacent to a radial-direction inside of the cutting edge of corner R 13. In the example of the present embodiment, the rake face 14 of the cutting edge of corner R 13 forms a flat surface shape.

In addition, in the outer surface of the insert main body 15, a flank surface of the cutting edge of corner R 13 is formed in a portion adjacent to a side opposite to the tool rotation direction R of the cutting edge of corner R 13. The flank surface of the cutting edge of corner R 13 forms a curved surface shape that protrudes toward the front end outer circumference side of the insert main body 15 and is formed toward the front end side in the central axis C direction and the radial-direction outside. The flank surface of the cutting edge of corner R 13 is inclined so as to face the base end side in the central axis C direction and the radial-direction inside from the cutting edge of corner R 13 toward the side opposite to the tool rotation direction R, which imparts a flank angle to the cutting edge of corner R 13.

In the cutting edge portion 4, a curvature radius of the bottom cutting edge 11 and a curvature radius of the outer peripheral cutting edge 9 are equal to each other. In the example of the present embodiment, the curvature radius of the bottom cutting edge 11 and the curvature radius of the outer peripheral cutting edge 9 are equal to an outer diameter (the maximum diameter of the cutting edge portion 4) of a rotation trajectory obtained by rotating the outer peripheral cutting edge 9 around the central axis C.

In addition, a curvature radius of the cutting edge of corner R 13 is smaller than the curvature radius of the bottom cutting edge 11 and a curvature radius of the outer peripheral cutting edge 9. In the example of the present embodiment, the curvature radius of the cutting edge of corner R 13 is 33% or less of the curvature radius of the bottom cutting edge 11 and the curvature radius of the outer peripheral cutting edge 9.

In addition, in the present embodiment, the rake face 12 of the bottom cutting edge 11, the rake face 10 of the outer peripheral cutting edge 9, and the rake face 14 of the cutting edge of corner R 13 are formed on the same planar surface. That is, all of the rake faces of the cutting edges of the cutting edge portion 4 are formed of a single planar surface.

Figure 8:
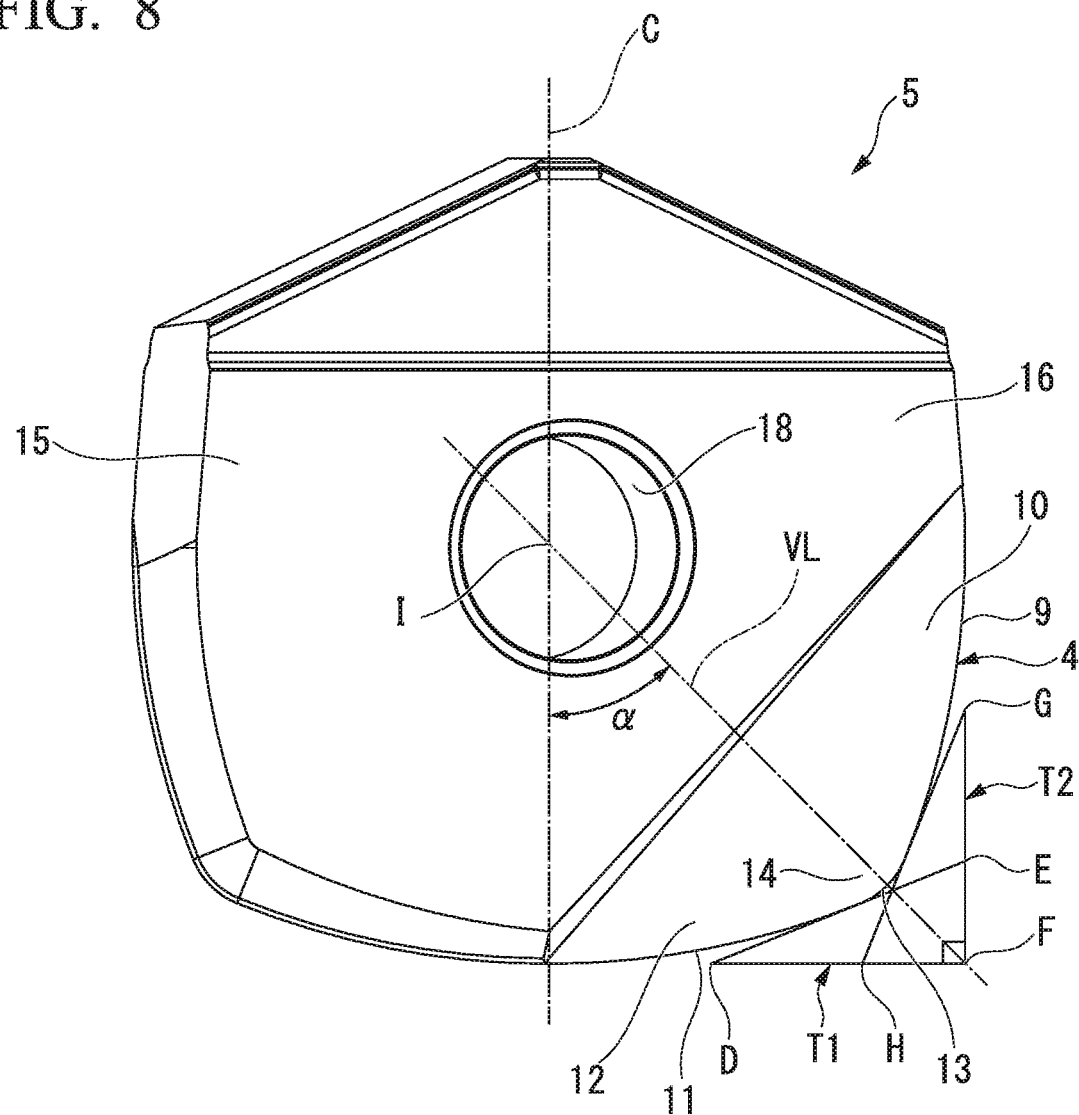
FIG. 8 is a plan view of the cutting insert according to an embodiment of the present invention in which a rake face of a cutting edge of corner R is seen as a front surface.

In addition, as illustrated in FIG. 7(a) and FIG. 8, when the rake face 14 of the cutting edge of corner R 13 is seen as the front surface, the bottom cutting edge 11 and the outer peripheral cutting edge 9 are formed so as to form a linearly symmetric shape together with respect to an imaginary straight line VL that passes through an arc central point O of the cutting edge of corner R 13, extends toward the base end side in the central axis C direction from the arc central point O toward the inside in the radial direction, and intersects the central axis C at an angle of 45° as a symmetry axis.

Specifically, in the present embodiment, when the rake face 14 of the cutting edge of corner R 13 is seen as the front surface, the total edge length of the cutting edges of the cutting edge portion 4 is formed in a linearly symmetric shape with respect to the imaginary straight line VL as a symmetry axis.

Meanwhile, in the example of the present embodiment, the rake face 12 of the bottom cutting edge 11, the rake face 10 of the outer peripheral cutting edge 9, and the rake face 14 of the cutting edge of corner R 13 are formed on the same planar surface with one another, and thus the expression "when the rake face 14 of the cutting edge of corner R 13 is seen as the front surface" has the same meaning as expressions "when the rake face 12 of the bottom cutting edge 11 is seen as the front surface" and "when rake face 10 of the outer peripheral cutting edge 9 is seen as the front surface".

In addition, the angle at refers to, between a sharp angle and an obtuse angle formed by the imaginary straight line VL and the central axis C which intersect each other, an angle of the sharp angle.

In addition, as illustrated in FIG. 7(a) and FIG. 8, when the rake face 14 of the cutting edge of corner R 13 is seen as the front surface, a straight line that passes through the front end of the bottom cutting edge 11 in the central axis C direction and extends in the radial direction is considered as a radial-direction reference line RR, a straight line that passes through the outer end of the outer peripheral cutting edge 9 in the radial direction and extends in the central axis C direction is considered as a central axis-direction reference line CR, a tangent line at the boundary point A between the cutting edge of corner R 13 and the bottom cutting edge 11 is considered as the first tangent line L1, a tangent line at the boundary point B between the cutting edge of corner R 13 and the outer peripheral cutting edge 9 is considered as the second tangent line L2, a rectangular triangle (ΔDEF) formed by connecting an intersection point D between the first tangent line L1 and the radial-direction reference line RR, an intersection point E between the first tangent line L1 and the central axis-direction reference line CR, and an intersection point F between the radial-direction reference line RR and the central axis-direction reference line CR together using straight lines is considered as a first rectangular triangle T1, and a rectangular triangle (ΔGHF) formed by connecting an intersection point G between the second tangent line L2 and the central axis-direction reference line CR, an intersection point H between the second tangent line L2 and the radial-direction reference line RR, and the intersection point F between the radial-direction reference line RR and the central axis-direction reference line CR together using straight lines is considered as a second rectangular triangle T2, the first rectangular triangle T1 and the second rectangular triangle T2 are congruent with each other.

In addition, in a front surface view of the rake face 14 of the cutting edge of corner R 13 illustrated in FIG. 7(a) and FIG. 8, an imaginary straight line passing through the intersection point F between the radial-direction reference line RR and the central axis-direction reference line CR and the arc central point O of the cutting edge of corner R 13 coincides with the imaginary straight line VL.

In addition, the hole center of the screw insertion hole 18 is located on the imaginary straight line VL. Specifically, in the front surface view of the rake face 14, the hole center of the screw insertion hole 18 is disposed on the intersection point I between the imaginary straight line VL and the central axis C.

In addition, when the rake face 14 of the cutting edge of corner R 13 is seen as the front surface, an angle θ1 formed between the first tangent line L1 and the radial-direction reference line RR is 12° to 25°, and an angle θ2 formed between the second tangent line L2 and the radial-direction reference line RR is (90°−θ1)°. In addition, the angle θ1 is more preferably 15° to 22°.

Meanwhile, the angle θ1 refers to, between a sharp angle and an obtuse angle formed by the first tangent line L1 and the radial-direction reference line RR which intersect each other, an angle of the sharp angle. In addition, the angle θ2 refers to, between a sharp angle and an obtuse angle formed by the second tangent line L2 and the radial-direction reference line RR which intersect each other, an angle of the sharp angle.

According to the cutting insert 5 and the indexable rotary cutting tool 6 of the present embodiment which have been described above, when the rake face 14 of the cutting edge of corner R 13 is seen as the front surface, the bottom cutting edge 11 and the outer peripheral cutting edge 9 are formed in a linearly symmetric shape with respect to the imaginary straight line VL that passes the arc central point (the center of the arc) O of the cutting edge of corner R 13 and intersects the central axis C at an angle c of 45° as a symmetry axis.

Alternately, when the rake face 14 of the cutting edge of corner R 13 is seen as the front surface, the curvature radius of the bottom cutting edge 11 and the curvature radius of the outer peripheral cutting edge 9 are equal to each other, and the first rectangular triangle T1 (ΔDEF) having the tangent line (the first tangent line) L1 of the boundary point A at which the cutting edge of corner R 13 and the bottom cutting edge 11 are connected together and the second rectangular triangle T2 (ΔGHF) having the tangent line (the second tangent line) L2 of the boundary point B at which the cutting edge of corner R 13 and the outer peripheral cutting edge 9 are connected together are congruent with each other.

Therefore, for example, kerfs (processing marks or processing scars) imparted to a processing surface of a work material by cutting with the bottom cutting edge 11 when a face-milling process (planar surface process) is carried out on the work material and kerfs imparted to the processing surface of the work material by cutting with the outer peripheral cutting edge 9 when a side-milling process (vertical wall surface process) is carried out are in a mutually identical status.

That is, in the present embodiment, the curvature radius of the bottom cutting edge 11 and the curvature radius of the outer peripheral cutting edge 9 are equal to each other, and the bottom cutting edge 11 and the outer peripheral cutting edge 9 are formed to be linearly symmetric to each other. Therefore, when an attempt is made to make the cusp height of the planar surface portion and the cusp height of the vertical wall portion identical to each other, it is possible to process both portions with the same pick feed (pitch), and it is possible to make the kerfs of the planar surface portion and the vertical wall portion similar to each other. Therefore, it is possible to obtain a processing surface provided with the same quality throughout the entire work material.

That is, in any case of a cutting process using the bottom cutting edge 11 or the outer peripheral cutting edge 9, it is possible to make the status of the processing surface of the work material constant.

Figure 11:
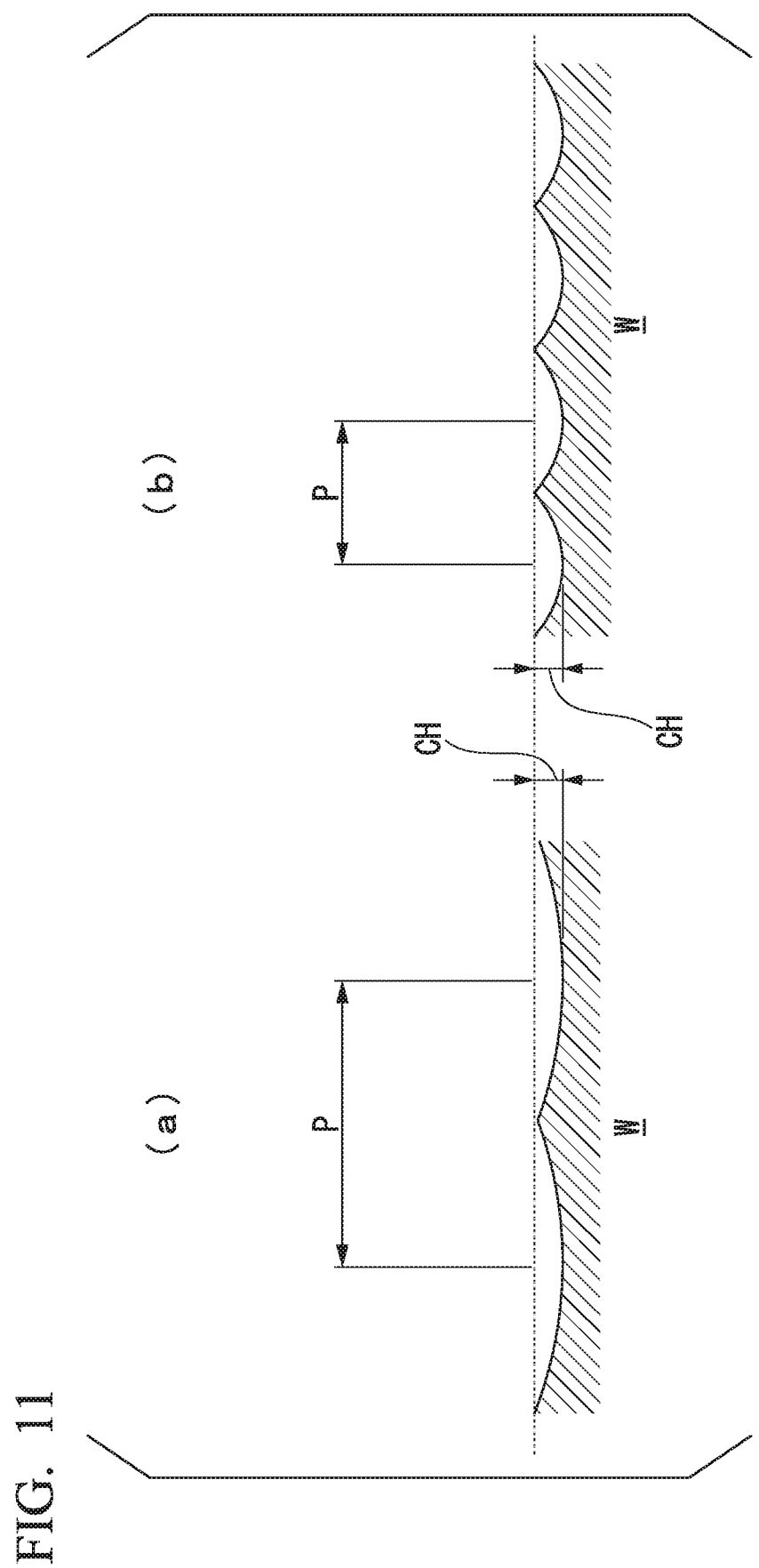
FIG. 11(a) is a view illustrating a pitch of a pick feed and a cusp height of a processing surface cut using the cutting insert (indexable rotary cutting tool) of the present invention.
FIG. 11(b) is a view illustrating a pitch of a pick feed and a cusp height of a processing surface cut using a cutting tool of the related art.

Here, FIG. 11(a) illustrating the pitch and the cusp height is referred to. FIG. 11(a) is a view illustrating a cross section of a processing surface of a work material W in an enlarged manner, and, in the view, a reference sign P represents a pitch (corresponding to a pitch of a pick feed) of a processing scar imparted to the processing surface of the work material W, and a reference sign CH represents a cusp height of the processing scar. According to the present embodiment, it is possible to make the pitch (width) P of the pick feed or the cusp height (depth) CH constant regardless of the processing portion or the shape of the work material W.

In addition, since the status of the processing surface of the work material can be made constant as described above, it is possible to make uniform the surface roughness, gloss, or the like of the processing surface throughout the entire processing surface. That is, it is possible to make uniform surface performance or visual quality throughout the entire processing surface. Therefore, it is possible to obtain an advantageous effect of an increase in the processing accuracy in a finishing process or a semi-finishing process.

In addition, a range of the slope angle of a processing surface that can be cut with the bottom cutting edge 11 in a face-milling process (planar surface process) and a range of the slope angle of a processing surface that can be cut with the outer peripheral cutting edge 9 in a side-milling process (vertical wall surface process) become equal to each other, and thus it is possible to deal with a larger number of processing shapes while making the status of the processing surface of the work material constant.

Meanwhile, in the case of using the cutting insert 5 and the indexable rotary cutting tool 6 of the present embodiment in a machine tool such as a multiaxis control machining center, the effect of the present embodiment becomes significantly more advantageous. The above-described multiaxis control refers to, for example, the control of four to six axes. When multiple axes are controlled, it becomes easy to process a plurality of processing surfaces having slopes that are different from each other to a more uniform status. In this case, it is possible to stably carry out a cutting process at a high accuracy even on, for example, a work material having a complicated three-dimensional curved surface such as a turbine blade.

Figure 9:
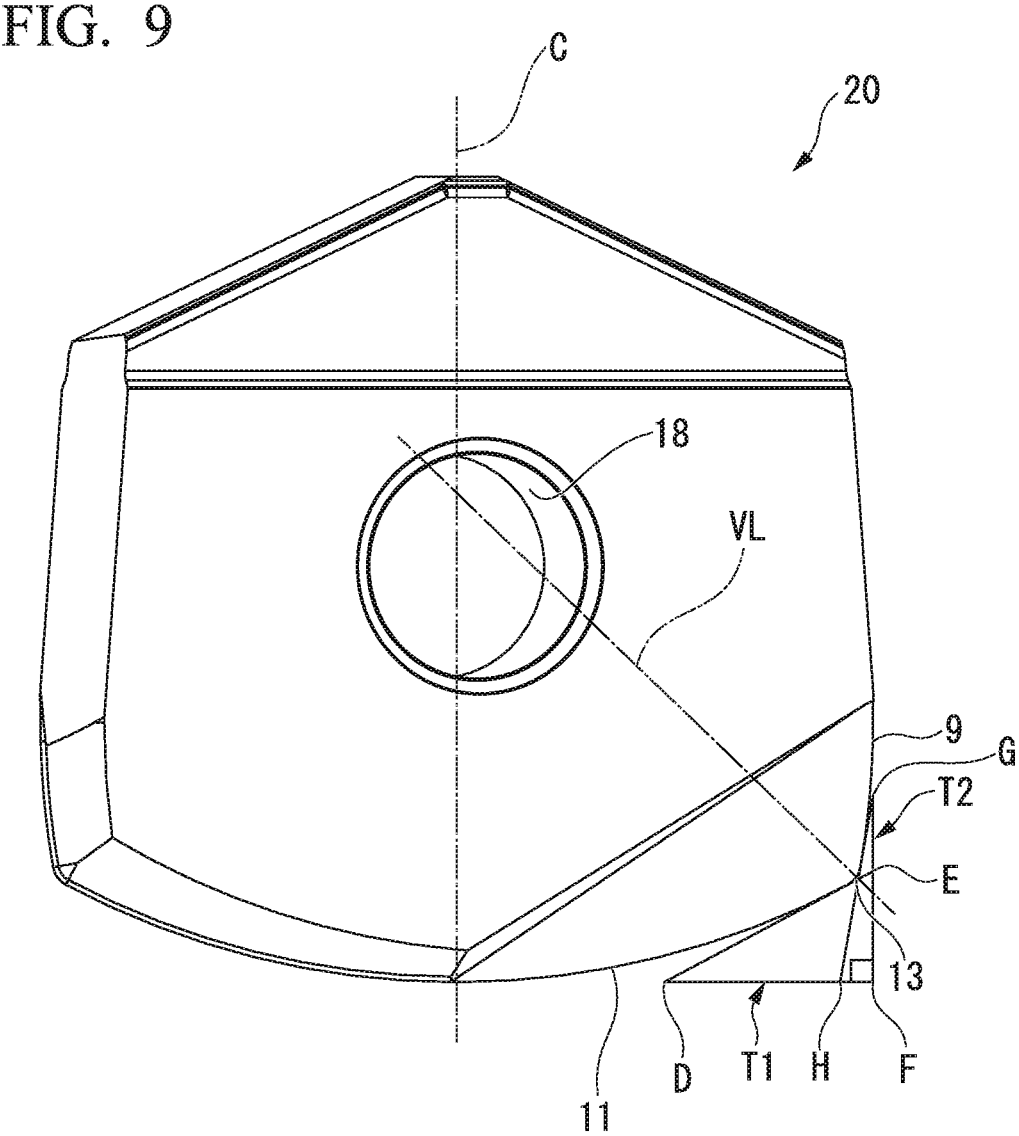
FIG. 9 is a plan view of the cutting insert according to a reference example in which the rake face of the cutting edge of corner R is seen as the front surface.
Figure 10:
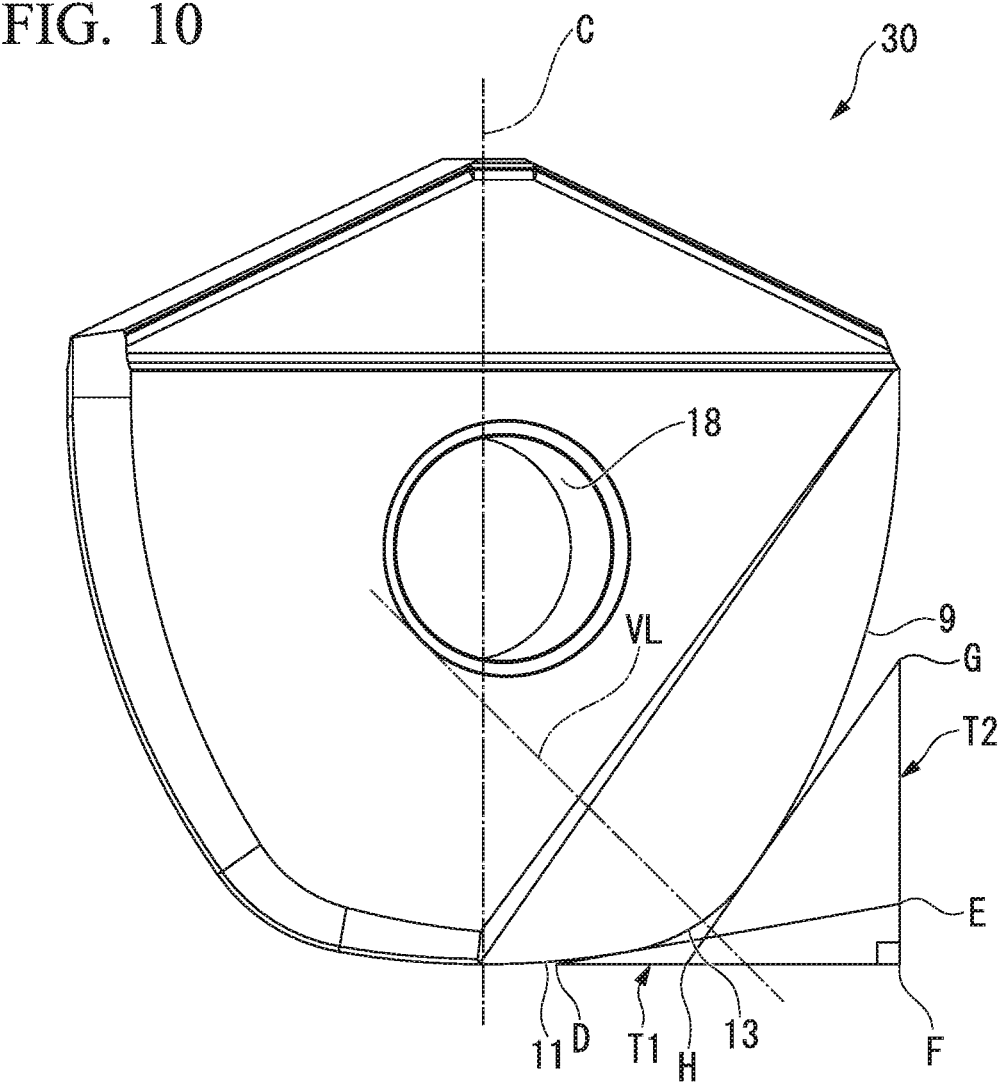
FIG. 10 is a plan view of the cutting insert according to a reference example in which the rake face of the cutting edge of corner R is seen as the front surface.

Here, the present embodiment will be described in more detail with reference to FIG. 8 to FIG. 10. FIG. 8 illustrates the cutting insert 5 of the present embodiment, and FIG. 9 and FIG. 10 illustrate cutting inserts 20 and 30 of reference examples having a different technical concept from the present embodiment. FIG. 8 to FIG. 10 are respectively plan views of the cutting inserts 5, 20, and 30 in which the rake face 14 of the cutting edge of corner R 13 is seen as the front surface. In all of the three cutting inserts 5, 20, and 30 illustrated in FIG. 8 to FIG. 10, the curvature radius of the bottom cutting edge 11 and the curvature radius of the outer peripheral cutting edge 9 are equal to each other.

In addition, in the cutting insert 5 of the present embodiment which is illustrated in FIG. 8, the bottom cutting edge 11 and the outer peripheral cutting edge 9 are formed so as to form a linearly symmetric shape together with respect to the imaginary straight line VL intersecting the central axis C at an angle $\alpha$ of 45° as a symmetry axis. In addition, in the cutting insert 5 of the present embodiment which is illustrated in FIG. 8, the first rectangular triangle T1 ($\Delta$DEF) and the second rectangular triangle T2 ($\Delta$GHF) are congruent with each other. Therefore, the above-described excellent effect is exhibited.

On the other hand, in the cutting inserts 20 and 30 of the reference examples which are illustrated in FIG. 9 and FIG. 10, the curvature radius of the bottom cutting edge 11 and the curvature radius of the outer peripheral cutting edge 9 are equal to each other, but the bottom cutting edge 11 and the outer peripheral cutting edge 9 are not formed in a linearly symmetric shape with respect to the imaginary straight line VL that passes through the arc central point of the cutting edge of corner R 13 and intersects the central axis C at an angle of 45°. In addition, in the cutting inserts 20 and 30 of the reference examples which are illustrated in FIG. 9 and FIG. 10, the first rectangular triangle T1 ($\Delta$DEF) and the second rectangular triangle T2 ($\Delta$GHF) are not congruent with each other. Here, a side GF is a straight line that passes through the outer end of the outer peripheral cutting edge 9 in the radial direction and extends in the central axis C direction, a side DF is a straight line that passes through the front end of the bottom cutting edge 11 in the central axis C direction and extends in the radial direction, a side GH is a tangent line at the boundary point between the cutting edge of corner R 13 and the outer peripheral cutting edge 9, and a side DE is a tangent line at the boundary point between the cutting edge of corner R 13 and the bottom cutting edge 11.

Therefore, in the cutting inserts 20 and 30 of the reference examples which are illustrated in FIG. 9 and FIG. 10, there is a case in which it is difficult to make kerfs imparted to a processing surface by carrying out a face-milling process (planar surface process) on a work material and kerfs imparted to the processing surface by carrying out a side-milling process (vertical wall surface process) on the work material in a mutually identical status. That is, even when, simply, the curvature radius of the bottom cutting edge 11 and the curvature radius of the outer peripheral cutting edge 9 are set to be equal to each other, an excellent effect as in the present embodiment described above cannot be obtained at all times.

In addition, according to the present embodiment, compared with a cutting tool of the related art such as a ball end mill or a radiance end mill, a processing time can be further shortened.

Specifically, in a ball end mill-type cutting tool of the related art, a rotation trajectory of a cutting edge portion around a central axis forms a semispherical shape, and a radius of this rotation trajectory is ½ of a tool diameter (the maximum diameter of the rotation trajectory of the cutting edge portion). In addition, in the ball end mill-type cutting tool, both a curvature radius of a cutting edge portion that corresponds to the bottom cutting edge and a curvature radius of a cutting edge portion that corresponds to the outer peripheral cutting edge become ½ of the tool diameter. That is, in the ball end mill-type cutting tool, a pick feed is set so that a cusp height becomes a predetermined value or less depending on the tool radius (½ of the tool diameter), and a cutting process is carried out. In addition, in the case of a radiance end mill-type cutting tool, a cutting edge of corner R is used to carry out a cutting process on a slope processing surface or the like, but the curvature radius of the cutting edge of corner R is, generally, smaller than the curvature radius of the cutting edge of the ball end mill (in a case in which the tool diameters are equal to each other), and thus the pick feed becomes smaller than that of the ball end mill.

In contrast, in the present embodiment, the curvature radius of the bottom cutting edge 11 and the curvature radius of the outer peripheral cutting edge 9 can be set to be larger than ½ of the tool diameter respectively. Therefore, even when a cusp height that is equal to the cusp height of a kerf on a processing surface processed with the ball end mill of the related art is obtained (that is, the cusp height is set to a predetermined value or less), according to the present embodiment, it is possible to set the pick feed (pitch) to be larger.

Meanwhile, in the present embodiment, the curvature radius of the bottom cutting edge 11 and the curvature radius of the outer peripheral cutting edge 9 are set to be equal to the tool diameter (the maximum diameter of the rotation trajectory of the cutting edge). Therefore, in the present embodiment, it is possible to set the pick feed to a value that approximately doubles the pick feed of the ball end mill of the related art.

Here, a difference in pick feed (pitch) between the present embodiment and a related art example will be described with reference to FIGS. 11(a) and 11(b). FIG. 11(a) illustrates a cross section of a processing surface (processing scars) of the work material W cut with the cutting insert 5 (indexable rotary cutting tool 6) of the present embodiment, and FIG. 11(b) illustrates a cross section of a processing surface of the work material W cut with the cutting tool of the related art. In the drawings, the reference sign P represents the pitch of the pick feed, and the reference sign CH represents the cusp height. As illustrated in FIGS. 11(a) and 11(b), in a case in which the cusp heights CH are set to be equal to one another, the pitch P of the pick feed can be increased more in the present embodiment of FIG. 11(a).

As described above, according to the present embodiment, it is possible to set the pick feed (pitch P) to be large while suppressing the cusp height CH to be small. Therefore, it is possible to decrease the number of protrusions and recesses (scraps) that are imparted to the processing surface as processing scars and increase the processing surface accuracy. In addition, it is possible to decrease a tool path length (total processing length) as much as the pick feed increased, and it becomes possible to shorten the processing time.

As a result of actually carrying out cutting tests on a work material (S50C) using the indexable rotary cutting tool 6 equipped with the cutting insert 5 of the present embodiment and the ball end mill of the related art example, it was confirmed that, in a case in which the tool diameters, the cutting speeds, the feed amounts, and the cusp heights (scrap heights) are set to be equal to each other, the processing time can be decreased by approximately 30% in the present embodiment compared with the related art example. In addition, it was found that both the arithmetic average roughness Ra and the ten-point average roughness Rz of the processing surface become smaller values in the present embodiment than in the related art example, and the processing surface accuracy is excellent.

In addition, the curvature radius of the cutting edge of corner R 13 that connects the bottom cutting edge 11 and the outer peripheral cutting edge 9 can be set to be smaller than, for example, ½ of the tool diameter. Therefore, it becomes possible to deal with a variety of cutting processes that are not possible with the ball end mill of the related art such as a cutting process of a corner portion of a work material using this cutting edge of corner R 13.

The above-described above shows that, according to the present embodiment, it is possible to carry out a cutting process so that the status of a processing surface becomes uniform regardless of the processing portion or the shape of a work material. Therefore, it is possible to obtain a favorable processing surface accuracy throughout the entire processing surface in a finishing process, a semi-finishing process, or the like.

In addition, in the present embodiment, the screw insertion hole 18 penetrating the insert main body 15 in the thickness direction is formed in the insert main body 15, and the fixing screw 8 for fixing the cutting insert 5 to the mounting seat 3 (the insert fitting groove 7) of the tool main body 1 is inserted into this screw insertion hole 18.

In addition, according to the present embodiment, the hole center of the screw insertion hole 18 is located on the imaginary straight line VL, and thus a force that rotates the cutting insert 5 around the screw insertion hole 18 (the fixing screw 8) is suppressed at the time of a cutting process using the bottom cutting edge 11 and the time of a cutting process using the outer peripheral cutting edge 9.

Specifically, at the time of the cutting process using the bottom cutting edge 11, a cutting edge normal direction component of a cutting resistance that the bottom cutting edge 11 receives acts toward the hole center of the screw insertion hole 18. In addition, at the time of the cutting process using the outer peripheral cutting edge 9, a cutting edge normal direction component of a cutting resistance that the outer peripheral cutting edge 9 receives acts toward the hole center of the screw insertion hole 18. Therefore, the force that rotates the cutting insert 5 fixed by the fixing screw 8 around the fixing screw 8 is alleviated, and a fine vibration (fine rotary vibration) of the cutting insert 5 relative to the mounting seat 3 is suppressed.

Therefore, the status of the processing surface of the work material is stabilized, and a high-accuracy process can be realized.

Particularly, in a finishing process or a semi-finishing process by a so-called surface along process in which a milling process is carried out on a constituent portion of a three-dimensional shape of a work material in a tool trajectory along an external surface of the constituent portion, an advantageous effect of an increase in the accuracy can be obtained.

In addition, in the present embodiment, the rake face 12 of the bottom cutting edge 11, the rake face 10 of the outer peripheral cutting edge 9, and the rake face 14 of the cutting edge of corner R 13 are formed on the same planar surface. Therefore, the axial-direction rake angles or the radial-direction rake angles seldom change throughout the entire length of the cutting edges.

However, generally, the rake face 12 of the bottom cutting edge 11, the rake face 10 of the outer peripheral cutting edge 9, and the rake face 14 of the cutting edge of corner R 13 are formed of mutually different planar surfaces or curved surfaces. In addition, the boundary point A between the cutting edge of corner R 13 and the bottom cutting edge 11 and the boundary point B between the cutting edge of corner R 13 and the outer peripheral cutting edge 9 are portions in which two cutting edges having mutually different shapes are connected together, and thus the axial-direction rake angles or the radial-direction rake angles change on both sides of the cutting edges sandwiching the boundary points A and B. Therefore, at the time of a cutting process, the cutting loads near the boundary points A and B are likely to increase.

Therefore, when the rake face 12 of the bottom cutting edge 11, the rake face 10 of the outer peripheral cutting edge 9, and the rake face 14 of the cutting edge of corner R 13 are formed on the same planar surface as in the present embodiment, the rake faces of the cutting edges are formed of a single planar surface even near the boundary points A and B.

Therefore, a significant change in the axial-direction rake angles or the radial-direction rake angles change on both sides of the cutting edges sandwiching the boundary points A and B is suppressed, and the action of a large cutting load near the boundary points A and B can be prevented. Therefore, an edge tip strength in the connection portion of the cutting edge of corner R 13 and the bottom cutting edge 11 and in the connection portion of the cutting edge of corner R 13 and the outer peripheral cutting edge 9 is significantly increased, and a tool service life extends.

In addition, since the rake face 12 of the bottom cutting edge 11, the rake face 10 of the outer peripheral cutting edge 9, and the rake face 14 of the cutting edge of corner R 13 are formed on the same planar surface, the manufacturing of the cutting insert 5 is easy. In addition, no recessed portions (trough portions) and the like are formed in portions (the connection portions) between these rake faces 10, 12, and 14, and thus the trapping of chips or the like at the times of a cutting process is suppressed, and a chip discharging property is enhanced.

In addition, in the present embodiment, when the rake face 14 of the cutting edge of corner R 13 is seen as the front surface, the angle $\theta 1$ formed between the first tangent line L1 and the radial-direction reference line RR is 12° to 25°, and the angle $\theta 2$ formed between the second tangent line L2 and the radial-direction reference line RR is (90°−$\theta 1$°), and thus it becomes easier to deal with the processing portion or the shape of a variety of work materials while ensuring a cutting edge strength near the cutting edge of corner R 13.

Specifically, since the angle $\theta 1$ is 12° or more (the angle $\theta 2$ is 78° or less), it is possible to suppress the edge length of the cutting edge of corner R 13 becoming excessively large. Therefore, it is possible to make the above-described effects of the present embodiment (the pitch P of the pick feed can be increased while suppressing the cusp height CH to be small) more significant by sufficiently ensuring individual edge lengths of the bottom cutting edge 11 and the outer peripheral cutting edge 9. In detail, in a case in which the angle $\theta 1$ is less than 12° (a case in which the angle $\theta 2$ exceeds 78°), the edge length of the cutting edge of corner R 13 becomes too large, consequently, the shape of the entire cutting edge including the bottom cutting edge 11, the outer peripheral cutting edge 9, and the cutting edge of corner R 13 becomes close to that of the ball end mill, and there is a concern that it may become difficult to obtain the above-described effects of the present embodiment. In addition, when the angle $\theta 1$ is 12° or more (the angle $\theta 2$ is 78° or less), it is possible to suppress the cutting edge of corner R 13 intervening a work material when processed with the outer peripheral cutting edge 9. Therefore, it becomes easy to deal with a variety of processing forms. Meanwhile, in order to make the above-described effects more significant, the angle $\theta 1$ is desirably 15° or more (the angle $\theta 2$ is 75° or less).

In addition, since the angle $\theta 1$ is 25° or less (the angle $\theta 2$ is 65° or more), even in a case in which the respective curvature radii of the bottom cutting edge 11 and the outer peripheral cutting edge 9 are set to be large, the cutting edge of corner R 13 being formed sharp toward the front end outer circumferential side of the tool is suppressed, and the stiffness of the cutting edge portion 4 near the cutting edge of corner R 13 can be ensured. Therefore, the significant loss of the edge tip near the cutting edge of corner R 13 is prevented. Meanwhile, in order to make this effect more significant, the angle $\theta 1$ is desirably 22° or less (the angle $\theta 2$ is 68° or more).

In addition, in the present embodiment, the curvature radius of the cutting edge of corner R 13 is set to be as sufficiently small as 33% or less of the curvature radius of the bottom cutting edge 11 and the curvature radius of the outer peripheral cutting edge 9, and thus, when the cutting edge of corner R 13 is used, it is easy to easily deal with a variety of cutting processes such as a cutting process or a profiling process of a corner portion of a work material. In addition, the curvature radius of the cutting edge of corner R 13 is set to be small, and thus it is possible to ensure the respective edge lengths of the bottom cutting edge 11 and the outer peripheral cutting edge 9 to be large.

Figure 12:
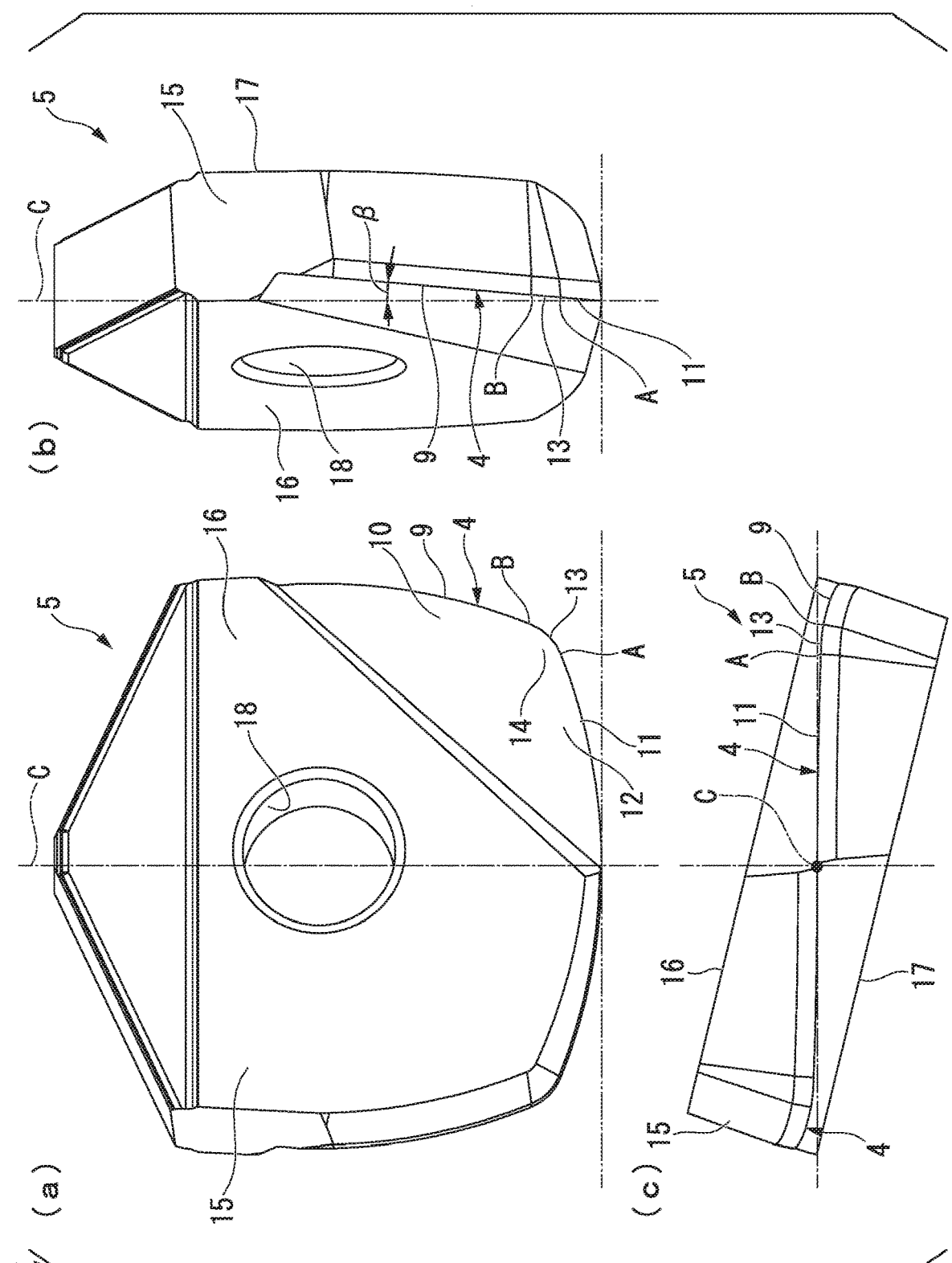
FIG. 12(a) is a plan view.
FIG. 12(b) is a side view.
FIG. 12(c) is a front view, which illustrate a modification example of the cutting insert according to an embodiment of the present invention.

Here, FIG. 12(*a*) to (*c*) illustrate modification examples of the cutting insert 5 of the present embodiment. In these modification examples, as illustrated in FIG. 12(*b*), the twist angle of the outer peripheral cutting edge 9 has a positive value, and the axial-direction rake angle of the cutting edge of corner R 13 at the boundary point B between the outer peripheral cutting edge 9 and the cutting edge of corner R 13 also has a positive value. In addition, the axial-direction rake angle of the cutting edge of corner R 13 at the boundary point A between the bottom cutting edge 11 and the cutting edge of corner R 13 also has a positive value. That is, all of the twist angle of the outer peripheral cutting edge 9, the axial-direction rake angle near the outer peripheral cutting edge 9 in the cutting edge of corner R 13, and the axial-direction rake angle near the bottom cutting edge 11 in the cutting edge of corner R 13 are positive angles.

Therefore, according to these modification examples, chips generated at the time of a cutting process are efficiently sent from the tool front end toward the base end side, and thus the chip discharging property is favorable. In addition, the chip discharging property is favorably maintained, and thus it is possible to increase the cutting rate, and the process efficiency improves.

In addition, in the examples illustrated in the drawings, the rake faces are formed of a single planar surface throughout the entire edge length of the cutting edges, and thus the twist angle of the outer peripheral cutting edge 9, the axial-direction rake angle of the cutting edge of corner R 13 at the boundary point B, the axial-direction rake angle of the cutting edge of corner R 13 at the boundary point A, and the axial-direction rake angle of the bottom cutting edge 11 are all set to the same angle $\beta$. Therefore, the chip discharging property is enhanced as described above.

Meanwhile, the present invention is not limited to the above-described embodiment, and it is possible to add a variety of modifications within the scope of the gist of the present invention.

For example, in the above-described embodiment, the screw insertion hole 18 is formed in the cutting insert 5, and the hole center of the screw insertion hole 18 is located on the imaginary straight line VL, but the constitution is not limited thereto. That is, the hole center of the screw insertion hole 18 may not be disposed on the imaginary straight line VL. However, the hole center of the screw insertion hole 18 is preferably disposed on the imaginary straight line VL since the excellent effect described in the embodiment can be obtained.

In addition, the screw insertion hole 18 may not be formed in the cutting insert 5, and, in this case, the cutting insert 5 is detachably mounted in the mounting seat 3 of the tool main body 1 using a clamp mechanism or the like.

In addition, in the above-described embodiment, the rake face 12 of the bottom cutting edge 11, the rake face 10 of the outer peripheral cutting edge 9, and the rake face 14 of the cutting edge of corner R 13 are formed on the same planar surface, but the constitution is not limited thereto, and these rake faces 10, 12, and 14 may also be formed on the same curved surface (a convex curved surface or a concave curved surface). Alternately, these rake faces 10, 12, and 14 may also be formed of mutually different planar surfaces or curved surfaces.

In addition, in the above-described embodiment, the angle θ1 is 12° to 25°, and the angle θ2 is (90°−θ1)°, but the numerical ranges of the angles θ1 and θ2 are not limited to the above-described ranges.

In addition, in the above-described embodiment, the curvature radius of the cutting edge of corner R 13 is 33% or less of the curvature radius of the bottom cutting edge 11 and the curvature radius of the outer peripheral cutting edge 9, but the curvature radius is not limited thereto. However, the curvature radius of the cutting edge of corner R 13 is set to be smaller than the curvature radius of the bottom cutting edge 11 and the curvature radius of the outer peripheral cutting edge 9.

In addition, in the above-described embodiment, as a material of a base body (the insert main body 15) of the cutting insert 5, it is also possible to use, for example, a cermet, high-speed steel, titanium carbide, silicon carbide, silicon nitride, aluminum nitride, aluminum oxide, a ceramic made of a mixture thereof, a cubic boron nitride sintered body, a diamond sintered body, or an ultrahigh-pressure sintered body obtained by firing a hard phase made of polycrystalline diamond or cubic boron nitride or a bonded phase of a ceramic, an iron-group metal, or the like in addition to cemented carbide including tungsten carbide (WC) and cobalt (Co).

In addition, the tool main body 1 is manufactured using, for example, an alloy tool steel such as SKD61, and, additionally, it is also possible to use a material formed by joining an alloy tool steel such as SKD61 and cemented carbide.

Additionally, within the scope of the gist of the present invention, the respective constitutions (constituent elements) described in the above-described embodiment, the modification examples, annexes, and the like may be combined together, and the addition, omission, substitution, and other modifications of the constitutions are possible. In addition, the present invention is not limited by the above-described embodiment and is limited only by the claims.

INDUSTRIAL APPLICABILITY

The cutting insert and the indexable rotary cutting tool of the present invention are capable of carrying out a cutting process so that the status of a processing surface becomes uniform regardless of the processing portion or the shape of a work material. In addition, in a finishing process, a semi-finishing process, or the like, a favorable processing surface accuracy can be obtained throughout the entire processing surface. Therefore, the cutting insert and the indexable rotary cutting tool are industrially applicable.

REFERENCE SIGNS LIST

1 TOOL MAIN BODY
2 FRONT END PORTION
3 MOUNTING SEAT
4 CUTTING EDGE PORTION
5 CUTTING INSERT
6 INDEXABLE ROTARY CUTTING TOOL
9 OUTER PERIPHERAL CUTTING EDGE
10 RAKE FACE OF OUTER PERIPHERAL CUTTING EDGE
11 BOTTOM CUTTING EDGE
12 RAKE FACE OF BOTTOM CUTTING EDGE
13 CUTTING EDGE OF CORNER R
14 RAKE FACE OF CUTTING EDGE OF CORNER R
15 INSERT MAIN BODY
18 SCREW INSERTION HOLE
A BOUNDARY POINT
B BOUNDARY POINT
C CENTRAL AXIS
CR CENTRAL AXIS-DIRECTION REFERENCE LINE
D, E, F, G, H INTERSECTION POINT
L1 FIRST TANGENT LINE
L2 SECOND TANGENT LINE
O ARC CENTRAL POINT
RR RADIAL-DIRECTION REFERENCE LINE
T1 FIRST RECTANGULAR TRIANGLE
T2 SECOND RECTANGULAR TRIANGLE
VL IMAGINARY STRAIGHT LINE
α ANGLE
β ANGLE (TWIST ANGLE, AXIAL-DIRECTION RAKE ANGLE)
θ1 ANGLE
θ2 ANGLE

The invention claimed is:
1. A cutting insert that is detachably mounted in an mounting seat formed in a front end portion of a tool main body that is rotated around a central axis, the cutting insert comprising:
a plate-shaped insert main body; and
a cutting edge portion formed in the insert main body,
wherein the cutting edge portion includes
a bottom cutting edge that is disposed in a front end portion of the insert main body in the central axis direction, extends along a radial direction that is orthogonal to the central axis, and forms an arc shape that protrudes toward a front end side in the central axis direction,
a rake face of the bottom cutting edge forms a flat surface shape,
an outer peripheral cutting edge that is disposed in an outer end portion of the insert main body in the radial direction, extends along the central axis direction, and forms an arc shape that protrudes toward an outside in the radial direction,
a rake face of the outer peripheral cutting edge forms a flat surface shape,
a cutting edge of corner R that connects an outer end of the bottom cutting edge in the radial direction and a front end of the outer peripheral cutting edge in the central axis direction and forms an arc shape that protrudes toward a front end outer circumferential side, and a rake face of the cutting edge of corner R forms a flat surface shape, wherein, when the rake face of the cutting edge of corner R is seen as a front surface, the bottom cutting edge and the outer peripheral cutting edge are formed so as to form a linearly symmetric shape together with respect to an imaginary straight line that passes through an arc central point of the cutting edge of corner R, extends toward a base end side in the central axis direction from the arc central point toward an inside in the radial direction, and intersects the central axis at an angle of 45° as a symmetry axis, a curvature radius of the bottom cutting edge and a curvature radius of the outer peripheral cutting edge is set to be larger than ½ of a maximum diameter of a rotation trajectory of the cutting edge portion respectively, and a curvature radius of the cutting edge of corner R is set to be smaller than ½ of the maximum diameter of the rotation trajectory of the cutting edge portion, wherein, the insert main body forms a flat plate shape and front and rear surfaces in a thickness direction of the insert main body form a pair of flat surface portions, the pair of flat surface portions is formed in 180° rotational symmetric manner with respect to the central axis as a symmetry axis, and the cutting edge portion including the outer peripheral cutting edge, the bottom cutting edge, and the cutting edge of corner R is provided in each of the pair of flat surface portions in a 180° rotational symmetric manner with respect to the central axis as the symmetry axis, and wherein, the rake face of the bottom cutting edge, the rake face of the outer peripheral cutting edge, and the rake face of the cutting edge of corner R are formed on a same planar surface, and all of rake faces of cutting edges of the cutting edge portion are formed of the single planar surface.

2. The cutting insert according to claim 1, wherein a screw insertion hole that penetrates the insert main body in a thickness direction is formed in the insert main body, and a hole center of the screw insertion hole is located on the imaginary straight line.

3. The cutting insert according to claim 1, wherein, when the rake face of the cutting edge of corner R is seen as the front surface, a straight line that passes through a front end of the bottom cutting edge in the central axis direction and extends in the radial direction is considered as a radial-direction reference line, the tangent line at the boundary point between the cutting edge of corner R and the bottom cutting edge is considered as the first tangent line, and the tangent line at the boundary point between the cutting edge of corner R and the outer peripheral cutting edge is considered as the second tangent line, an angle θ1 formed between the first tangent line and the radial-direction reference line is 12° to 25°, and an angle θ2 formed between the second tangent line and the radial-direction reference line is (90°-θ1°).

4. The cutting insert according to claim 1, wherein a curvature radius of the cutting edge of corner R is 33% or less of a curvature radius of the bottom cutting edge and a curvature radius of the outer peripheral cutting edge.

5. The cutting insert according to claim 1, wherein a twist angle of the outer peripheral cutting edge has a positive value, a radial-direction rake angle of the cutting edge of corner R at the boundary point between the cutting edge of corner R and the outer peripheral cutting edge has a positive value, and a radial-direction rake angle of the cutting edge of corner R at the boundary point between the cutting edge of corner R and the bottom cutting edge has a positive value.

6. An indexable rotary cutting tool, comprising:

a tool main body that is rotated around a central axis;

an mounting seat formed in a front end portion of the tool main body; and a cutting insert that is detachably mounted in the mounting seat, wherein the cutting insert according to claim 1 is used as the cutting insert.

7. A tool main body rotated around a central axis, comprising:

an mounting seat formed in a front end portion of the tool main body, wherein in the cutting insert according to claim 1 is detachably mounted in the mounting seat.

8. The cutting insert according to claim 1, wherein the cutting edge portion in each of the pair of flat surface portions forms a single straight line that passes from one to the other of the pair of flat surface portions through the central axis, when viewed from the central axis.

9. The cutting insert according to claim 1, wherein when the rake face of the cutting edge of corner R is seen as the front surface, the angle θ1 formed between the first tangent line and the radial-direction reference line is 12° to 25°, and the angle θ2 formed between the second tangent line and the radial-direction reference line is (90°-θ1°).

10. The cutting insert according to claim 1, wherein when the rake face of the cutting edge of corner R is seen as the front surface, the angle θ1 formed between the first tangent line and the radial-direction reference line is 12° to 25°, and the angle θ2 formed between the second tangent line and the radial-direction reference line is (90°-θ1°).

11. A cutting insert that is detachably mounted in an mounting seat formed in a front end portion of a tool main body that is rotated around a central axis, the cutting insert comprising:

a plate-shaped insert main body; and a cutting edge portion formed in the insert main body, wherein the cutting edge portion includes a bottom cutting edge that is disposed in a front end portion of the insert main body in the central axis direction, extends along a radial direction that is orthogonal to the central axis, and forms an arc shape that protrudes toward a front end side in the central axis direction, a rake face of the bottom cutting edge forms a flat surface shape, an outer peripheral cutting edge that is disposed in an outer end portion of the insert main body in the radial direction, extends along the central axis direction, and forms an arc shape that protrudes toward an outside in the radial direction, a rake face of the outer peripheral cutting edge forms a flat surface shape, a cutting edge of corner R that connects an outer end of the bottom cutting edge in the radial direction and a front end of the outer peripheral cutting edge in the central axis direction and forms an arc shape that protrudes toward a front end outer circumferential side, and a rake face of the cutting edge of corner R forms a flat surface shape, wherein, a curvature radius of the bottom cutting edge and a curvature radius of the outer peripheral cutting edge are equal to each other, the curvature radius of the bottom cutting edge and the curvature radius of the outer peripheral cutting edge is set to be larger than ½ of a maximum diameter of a rotation trajectory of the cutting edge portion respectively, and a curvature radius of the cutting edge of corner R is set to be smaller than ½ of the maximum diameter of the rotation trajectory of the cutting edge portion, when the rake face of the cutting edge of corner R is seen as a front surface, a straight line that passes through a front end of the bottom cutting edge in the central axis direction and extends in the radial direction is considered as a radial-direction reference line, a straight line that passes through an outer end of the outer peripheral cutting edge in the radial direction and extends in the central axis direction is considered as a central axis-direction reference line, a tangent line at a boundary point between the cutting edge of corner R and the bottom cutting edge is considered as a first tangent line, a tangent line at a boundary point between the cutting edge of corner R and the outer peripheral cutting edge is considered as a second tangent line, a rectangular triangle formed by connecting an intersection point between the first tangent line and the radial-direction reference line, an intersection point between the first tangent line and the central axis-direction reference line, and an intersection point between the radial-direction reference line and the central axis-direction reference line together using straight lines is considered as a first rectangular triangle, and a rectangular triangle formed by connecting an intersection point between the second tangent line and the central axis-direction reference line, an intersection point between the second tangent line and the radial-direction reference line, and the intersection point between the radial-direction reference line and the central axis-direction reference line together using straight lines is considered as a second rectangular triangle, the first rectangular triangle and the second rectangular triangle are congruent with each other, wherein, the insert main body forms a flat plate shape and front and rear surfaces in a thickness direction of the insert main body form a pair of flat surface portions, the pair of flat surface portions is formed in 180° rotational symmetric manner with respect to the central axis as a symmetry axis, and the cutting edge portion including the outer peripheral cutting edge, the bottom cutting edge, and the cutting edge of corner R is provided in each of the pair of flat surface portions in a 180° rotational symmetric manner with respect to the central axis as the symmetry axis, and wherein, the rake face of the bottom cutting edge, the rake face of the outer peripheral cutting edge, and the rake face of the cutting edge of corner R are formed on a same planar surface, and all of rake faces of cutting edges of the cutting edge portion are formed of the single planar surface.

12. The cutting insert according to claim 11, wherein a screw insertion hole that penetrates the insert main body in a thickness direction is formed in the insert main body, and a hole center of the screw insertion hole is located on an imaginary straight line that passes through the intersection point between the radial-direction reference line and the central axis-direction reference line and an arc central point of the cutting edge of corner R.

13. The cutting insert according to claim 11, wherein, when the rake face of the cutting edge of corner R is seen as the front surface, a straight line that passes through a front end of the bottom cutting edge in the central axis direction and extends in the radial direction is considered as a radial-direction reference line, the tangent line at the boundary point between the cutting edge of corner R and the bottom cutting edge is considered as the first tangent line, and the tangent line at the boundary point between the cutting edge of corner R and the outer peripheral cutting edge is considered as the second tangent line, an angle θ1 formed between the first tangent line and the radial-direction reference line is 12° to 25°, and an angle θ2 formed between the second tangent line and the radial-direction reference line is (90°-θ1°).

14. The cutting insert according to claim 11, wherein a curvature radius of the cutting edge of corner R is 33% or less of a curvature radius of the bottom cutting edge and a curvature radius of the outer peripheral cutting edge.

15. The cutting insert according to claim 11, wherein a twist angle of the outer peripheral cutting edge has a positive value, a radial-direction rake angle of the cutting edge of corner R at the boundary point between the cutting edge of corner R and the outer peripheral cutting edge has a positive value, and a radial-direction rake angle of the cutting edge of corner R at the boundary point between the cutting edge of corner R and the bottom cutting edge has a positive value.

16. An indexable rotary cutting tool, comprising:

a tool main body that is rotated around a central axis;

an mounting seat formed in a front end portion of the tool main body; and a cutting insert that is detachably mounted in the mounting seat, wherein the cutting insert according to claim 11 is used as the cutting insert.

17. A tool main body rotated around a central axis, comprising:

an mounting seat formed in a front end portion of the tool main body, wherein in the cutting insert according to claim 11 is detachably mounted in the mounting seat.

18. The cutting insert according to claim 11, wherein the cutting edge portion in each of the pair of flat surface portions forms a single straight line that passes from one to the other of the pair of flat surface portions through the central axis, when viewed from the central axis.

* * * * *